(12) United States Patent
Shikata

(10) Patent No.: US 9,819,873 B2
(45) Date of Patent: Nov. 14, 2017

(54) IMAGE-PROCESSING APPARATUS AND IMAGE-PROCESSING METHOD

(71) Applicant: CANON KABUSHIKI KAISHA, Tokyo (JP)

(72) Inventor: Yasushi Shikata, Tama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/185,213

(22) Filed: Jun. 17, 2016

(65) Prior Publication Data

US 2016/0381302 A1 Dec. 29, 2016

(30) Foreign Application Priority Data

Jun. 25, 2015 (JP) .................................. 2015-127843
Apr. 11, 2016 (JP) .................................. 2016-078863

(51) Int. Cl.
*H04N 5/235* (2006.01)
*H04N 5/232* (2006.01)

(52) U.S. Cl.
CPC ......... *H04N 5/2353* (2013.01); *H04N 5/2355* (2013.01); *H04N 5/2356* (2013.01); *H04N 5/23229* (2013.01)

(58) Field of Classification Search
None
See application file for complete search history.

(56) References Cited

U.S. PATENT DOCUMENTS

| 2007/0291189 | A1* | 12/2007 | Harville | G06F 3/1423 349/7 |
| 2012/0249728 | A1* | 10/2012 | Kato | H04N 1/3871 348/36 |
| 2014/0002694 | A1* | 1/2014 | Levy | G06T 5/50 348/239 |
| 2014/0212065 | A1* | 7/2014 | Hirai | H04N 5/23235 382/284 |
| 2015/0281545 | A1* | 10/2015 | Aokage | G06T 5/009 348/239 |

FOREIGN PATENT DOCUMENTS

JP 2012-084983 A 4/2012
JP 2012-175277 A 9/2012

* cited by examiner

*Primary Examiner* — Shahbaz Nazrul
(74) *Attorney, Agent, or Firm* — Cowan, Liebowitz & Latman, P.C.

(57) ABSTRACT

An image-processing apparatus according to the present invention includes: a first acquiring unit configured to acquire moving image data including a first frame obtained by imaging and a second frame obtained by imaging with a shorter exposure time than the first frame; a second acquiring unit configured to acquire reproduction information that is information related to a reproduction speed of the moving image data; and a combining unit configured to combine the first frame and the second frame with each other based on the reproduction information, wherein the combining unit changes a combination ratio between the first frame and the second frame in accordance with a reproduction speed of the moving image data.

19 Claims, 19 Drawing Sheets

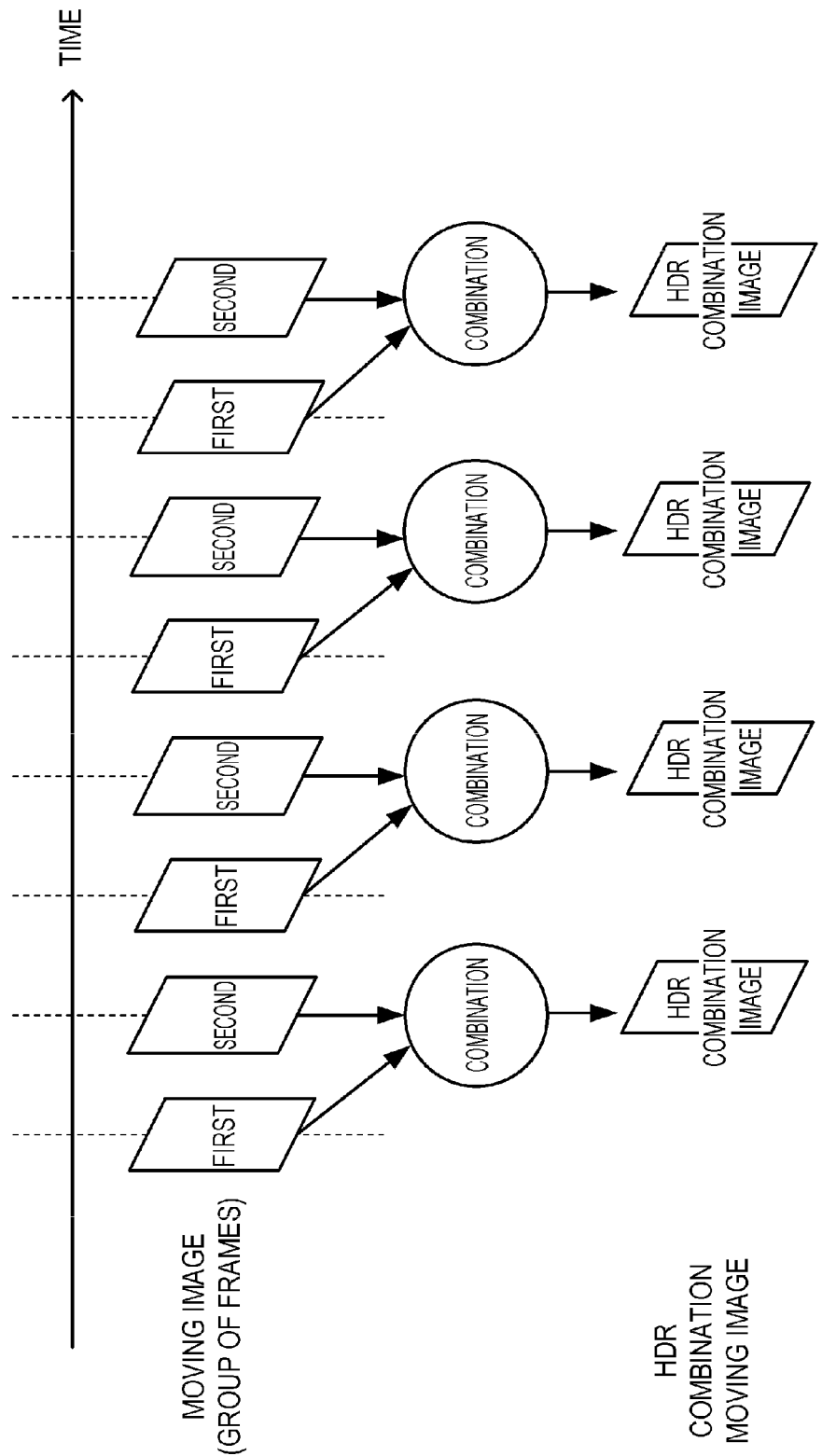

IMAGE-PROCESSING APPARATUS AND IMAGE-PROCESSING METHOD

BACKGROUND OF THE INVENTION

Field of the Invention

The present invention relates to an image-processing apparatus and an image-processing method.

Description of the Related Art

Techniques exist for generating an image with a high dynamic range by combining a plurality of images including an image (a first frame) obtained by imaging with a relatively long exposure time and an image (a second frame) obtained by imaging with a relatively short exposure time. Such a technique (combination) is referred to as "high dynamic range combination (HDR combination)" and an image generated by HDR combination is referred to as a "high dynamic range combine image (HDR combine image)". Performing HDR combination enables an HDR combine image to be generated in which occurrences of overshooting of data related to received light due to exposure time are suppressed. In other words, an HDR combine image in which occurrences of blown-out highlights and black defects are suppressed can be generated.

In recent years, it has become possible to obtain, as a captured moving image (a moving image obtained by imaging), a moving image (an HDR combine moving image) in which each frame is constituted by an HDR combine image, by performing HDR combination in real time during imaging. FIG. 16 shows how an HDR combine moving image is generated. In the example shown in FIG. 16, first frames and second frames are alternately obtained by imaging, and every time a first frame and a second frame are obtained, the obtained first frame and second frame are combined so as to generate an HDR combine image. Accordingly, an HDR combine moving image is generated.

In a case of generating an HDR moving image, changing weights of a first frame and a second frame in HDR combination enables the degree of motion blur of a subject (a perceived focus of the subject) to be changed in addition to changing a dynamic range. FIG. 17A shows an example of a first frame obtained by imaging of a black circular object moving in a horizontal direction. In the first frame, due to a long exposure time, while gradation information of dark portions can be retained in detail, motion blur is prominent. FIG. 17B shows an example of a second frame obtained by imaging of the black circular object moving in the horizontal direction. In the second frame, due to a short exposure time, gradation information of bright portions can be retained in detail and motion blur is not prominent. FIGS. 17C and 17D show examples of HDR combine images obtained by combining the first frame shown in FIG. 17A and the second frame shown in FIG. 17B. FIG. 17C shows an example of a case where a weight of the first frame is large and a weight of the second frame is small. In this case, as shown in FIG. 17C, an HDR image that retains motion blur is generated. FIG. 17D shows an example of a case where the weight of the first frame is small and the weight of the second frame is large. In this case, as shown in FIG. 17D, an HDR image with smaller motion blur than in FIG. 17C is generated. Generally, in a case of reproducing a moving image at a normal reproduction speed, an image that retains motion blur to a certain degree (such as the image shown in FIG. 17C) is desirably used in order to express natural motion. On the other hand, in a case of reproducing a moving image at a slower reproduction speed than a normal reproduction speed (slow reproduction and pause reproduction), an image with a sharper perceived focus (such as the image shown in FIG. 17D) is desirably used.

In recent years, sizes of imaging sensors in video cameras have been increasing and more and more video cameras enable a wide variety of lenses designed for single-lens reflex cameras to be mounted therein. Against this backdrop, a work flow involving acquiring a high resolution moving image by imaging and extracting a single frame of the moving image as a still image is attracting attention. Hereinafter, such a work flow will be referred to as a "motion capture work flow". In a motion capture work flow, for example, a high resolution moving image for a commercial or a PV (promotional video) is acquired by imaging and a single frame of the high resolution moving image is extracted as a still image to be used in a magazine or for an advertisement.

FIG. 18 is a diagram showing an example of a configuration of an image display system used in a motion capture work flow. The image display system shown in FIG. includes an imaging apparatus 1100, a reproducing apparatus 1200, a developing apparatus 1300, and an image display apparatus 1400. The imaging apparatus 1100 generates moving image data by imaging and outputs the generated moving image data. As moving image data, the imaging apparatus 1100 outputs RAW moving image data in which image data of each frame is RAW image data. The reproducing apparatus 1200 stores the RAW moving image data output from the imaging apparatus 1100. In addition, the reproducing apparatus 1200 outputs the stored RAW moving image data. The developing apparatus 1300 performs a developing process on the RAW moving image data output from the reproducing apparatus 1200 and outputs the moving image data after the developing process. The image display apparatus 1400 displays a moving image based on the moving image data output from the developing apparatus 1300.

In the image display system shown in FIG. 18, first, RAW moving image data obtained by the imaging apparatus 1100 is accumulated in the reproducing apparatus 1200. Subsequently, the RAW moving image data accumulated in the reproducing apparatus 1200 is developed by the developing apparatus 1300 and a result of the development is displayed by the image display apparatus 1400. A user (for example, a cameraman) checks a captured moving image, selects a still image, or takes other relevant actions by viewing the display of the image display apparatus 1400.

FIG. 19 is a flow chart showing an example of a motion capture work flow. Work performed from a state where normal reproduction of a captured moving image is being conducted will now be described. Normal reproduction refers to a reproduction method in which a moving image is reproduced at a normal reproduction speed.

First, the user checks the display of the image display apparatus 1400 and searches for a group of images (a scene) which may be usable as a still image (S1001; checking work). In addition, the user performs a user operation (a pause operation) for pause reproduction from a frame near the searched group of images and repetitively performs a user operation (a frame-by-frame operation) for frame-by-frame reproduction (S1002). Accordingly, a frame near the searched group of images is displayed and, each time a frame-by-frame operation is performed, the display is switched to a next frame. Next, the user checks the display of the image display apparatus 1400 while performing frame-by-frame operations and selects a frame to be used as a still image (S1003; selection work). Generally, a frame is selected in consideration of a presence or an absence of a perceived focus in addition to a composition of an image. For example, a frame retaining a necessary and sufficient perceived focus for use in a magazine or an advertisement is selected. The user then performs a user operation (an extraction operation) for extracting RAW image data of the selected frame from the reproducing apparatus 1200 as still image data (S1004). Next, the user determines whether or not the motion capture work flow is to be ended (S1005). In a case of ending the motion capture work flow, the present flowchart is ended, but in a case of not ending the motion capture work flow, work is returned to S1002 and a frame-by-frame operation is performed again. Work may be returned to S1001 in a case where the motion capture work flow is not ended. Moreover, RAW image data is extremely suitable for editing images. By extracting RAW image data as still image data, editing work such as retouching in accordance with applications such as magazines and advertisements can be performed in a preferable manner.

In a case of generating an HDR combine moving image in the motion capture work flow, in the checking work in S1001, an HDR combine moving image is favorably generated by using weights suitable for reproducing moving images at a normal reproduction speed. However, the use of such weights often results in displays with an insufficient perceived focus being performed in the selection work in S1003. It is assumed that, in a case where such a display is performed, weights are adjusted by the user.

In a motion capture work flow, selecting a preferable image from an enormous number of images (frames) requires an extremely long period of time and places a huge burden on the user. An added requirement of adjustment of weights in the selection work further increases work time or the burden on the user.

Conventional art related to HDR combination is disclosed in, for example, Japanese Patent Application Laid-open No. 2012-084983 and Japanese Patent Application Laid-open No. 2012-175277. With the technique disclosed in Japanese Patent Application Laid-open No. 2012-084983, weights of an image created by long-time exposure and an image created by short-time exposure are adjusted based on a presence or an absence of motion of a subject in an HDR combine moving image. With the technique disclosed in Japanese Patent Application Laid-open No. 2012-175277, the number of images used in HDR combination and exposure conditions of the images used in the HDR combination are adjusted in accordance with a user operation.

However, with the techniques disclosed in Japanese Patent Application Laid-open No. 2012-084983 and Japanese Patent Application Laid-open No. 2012-175277, a weight is uniquely determined with respect to one frame of an HDR combine moving image. In a case where a weight is uniquely determined with respect to one frame, an unnatural display with a small motion blur may be performed during the checking work in S1001 and a display with an insufficient perceived focus may be performed during the selection work in S1003. Therefore, as a weight with respect to a same frame, different weights are favorably used during checking work and during selection work. Such processing cannot be realized using the techniques disclosed in Japanese Patent Application Laid-open No. 2012-084983 and Japanese Patent Application Laid-open No. 2012-175277 and, as a result, a user operation to adjust weights is required.

SUMMARY OF THE INVENTION

The present invention provides a technique which enables a combine moving image with a preferable degree of motion blur of a subject (a perceived focus of a subject) to be readily obtained.

The present invention in its first aspect provides an image-processing apparatus comprising:
a first acquiring unit configured to acquire moving image data including a first frame obtained by imaging and a second frame obtained by imaging with a shorter exposure time than the first frame;
a second acquiring unit configured to acquire reproduction information that is information related to areproduction speed of the moving image data; and
a combining unit configured to combine the first frame and the second frame with each other based on the reproduction information, wherein
the combining unit changes a combination ratio between the first frame and the second frame in accordance with a reproduction speed of the moving image data.

The present invention in its second aspect provides an image-processing method comprising:
a first acquiring step acquiring moving image data including a first frame obtained by imaging and a second frame obtained by imaging with a shorter exposure time than the first frame;
a second acquiring step of acquiring reproduction information that is information related to a reproduction speed of the moving image data; and
a combining step of combining the first frame and the second frame with each other based on the reproduction information, wherein
in the combining step, a combination ratio between the first frame and the second frame is changed in accordance with a reproduction speed of the moving image data.

The present invention in its third aspect provides a non-transitory computer readable medium that stores a program, wherein
the program causes a computer to execute
 a first acquiring step acquiring moving image data including a first frame obtained by imaging and a second frame obtained by imaging with a shorter exposure time than the first frame;
 a second acquiring step of acquiring reproduction information that is information related to a reproduction speed of the moving image data; and
 a combining step of combining the first frame and the second frame with each other based on the reproduction information, and
in the combining step, a combination ratio between the first frame and the second frame is changed in accordance with a reproduction speed of the moving image data.

According to the present invention, a combine moving image with a preferable degree of motion blur of a subject (a perceived focus of a subject) can be readily obtained.

Further features of the present invention will become apparent from the following description of exemplary embodiments with reference to the attached drawings.

BRIEF DESCRIPTION OF THE DRAWINGS

FIG. 16 is a diagram showing an example of how an HDR combine moving image is generated;

DESCRIPTION OF THE EMBODIMENTS

First Embodiment

Hereinafter, an image display apparatus and an image-processing method according to a first embodiment of the present invention will be described. Moreover, while an example in which an image-processing apparatus according to the present embodiment is provided in an image display apparatus will be hereinafter described, the image-processing apparatus according to the present embodiment may be a separate apparatus from an image display apparatus. The image-processing apparatus according to the present embodiment may be provided in an apparatus other than an image display apparatus.

Figure 1:
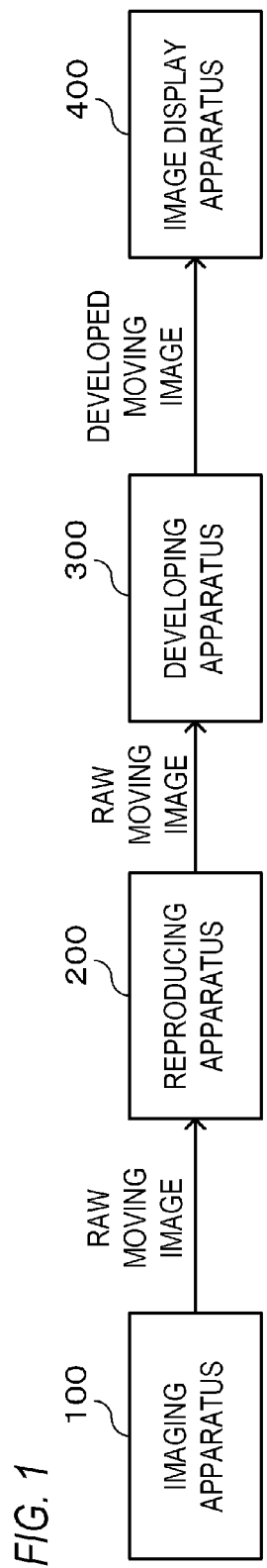
FIG. 1 is a diagram showing an example of a configuration of an image display system according to a first embodiment.

FIG. 1 is a diagram showing an example of a configuration of an image display system according to the present embodiment. The image display system shown in FIG. 1 is used in, for example, a motion capture work flow. As shown in FIG. 1, the image display system according to the present embodiment includes an imaging apparatus 100, a reproducing apparatus 200, a developing apparatus 300, and an image display apparatus 400.

The imaging apparatus 100 generates moving image data by imaging and outputs the generated moving image data. In the present embodiment, as moving image data, the imaging apparatus 100 outputs RAW moving image data in which image data of each frame is RAW image data. The reproducing apparatus 200 stores the RAW moving image data output from the imaging apparatus 100 in a storage unit. In addition, the reproducing apparatus 200 reads out RAW moving image data from the storage unit, generates RAW moving image data based on a set reproduction method from the read-out RAW moving image data, and outputs the generated RAW moving image data. The developing apparatus 300 performs a developing process on the RAW moving image data output from the reproducing apparatus 200 and outputs the moving image data after the developing process. The image display apparatus 400 displays a moving image based on the moving image data output from the developing apparatus 300.

Moreover, two or more apparatuses among the imaging apparatus 100, the reproducing apparatus 200, the developing apparatus 300, and the image display apparatus 400 may be integrated with each other. For example, the reproducing apparatus 200 and the developing apparatus 300 may be integrated with each other, the imaging apparatus 100, the reproducing apparatus 200, and the developing apparatus 300 may be integrated with each other, or the developing apparatus 300 and the image display apparatus 400 may be integrated with each other.

Moreover, a developing process may be performed by the imaging apparatus 100 in a case where the imaging apparatus 100 outputs moving image data. A developing process may be performed by the reproducing apparatus 200 in a case where the reproducing apparatus 200 stores moving image data in the storage unit. A developing process may be performed by the reproducing apparatus 200 in a case where the reproducing apparatus 200 generates moving image data based on a set reproduction method. A developing process may be performed by the reproducing apparatus 200 in a case where the reproducing apparatus 200 outputs moving image data. In a case where a developing process is to be performed by the imaging apparatus 100 or the reproducing apparatus 200, the developing apparatus 300 is no longer required. Such a case may be described as "the developing apparatus 300 being provided in the imaging apparatus 100 or the reproducing apparatus 200".

Figure 2:
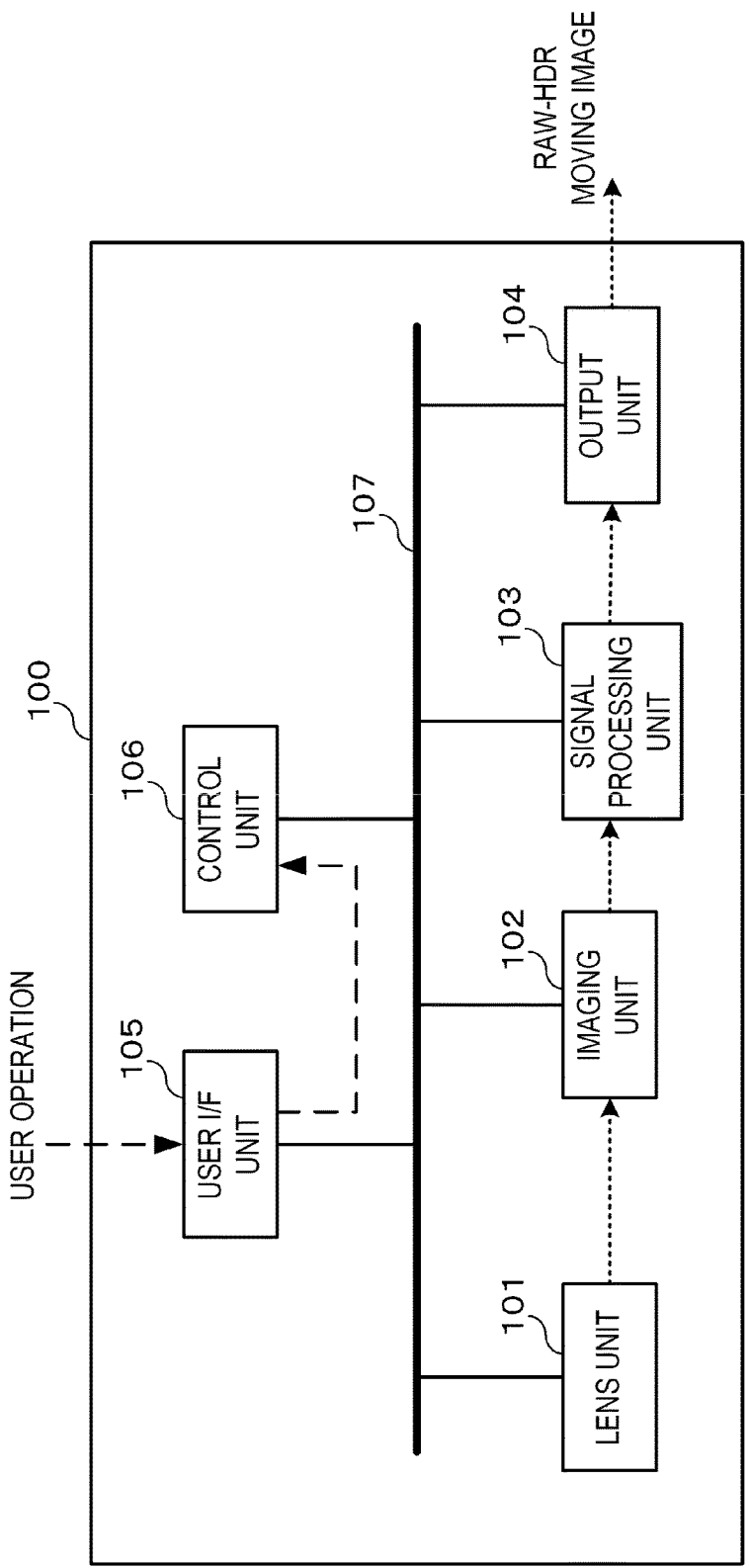
FIG. 2 is a block diagram showing an example of a functional configuration of an imaging apparatus according to the first embodiment.

FIG. 2 is a block diagram showing an example of a functional configuration of the imaging apparatus 100. As shown in FIG. 2, the imaging apparatus 100 at least includes a lens unit 101, an imaging unit 102, a signal processing unit 103, an output unit 104, a user I/F unit 105, and a control unit 106. These functional units are connected to each other by an internal bus 107. Transmission and reception of data among the functional units are performed using the internal bus 107. Operations of the respective functional units are controlled by the control unit 106.

The lens unit 101 is installed in a stage prior to the imaging unit 102 and causes incident light that is light from an imaging object (a subject) to focus at the imaging unit 102.

The imaging unit 102 performs an exposure changing process for changing an exposure time of the incident light focused by the lens unit 101, converts the incident light into an analog electrical signal (imaging), and outputs the obtained analog electrical signal. In the present embodiment, first imaging and second imaging with a shorter exposure time than the first imaging are alternately performed at the imaging unit 102. In addition, an analog electrical signal obtained by the first imaging and an analog electrical signal obtained by the second imaging are alternately output from the imaging unit 102.

The signal processing unit 103 converts the analog electrical signal output from the imaging unit 102 into RAW image data that is a digital electrical signal by performing signal processing on the analog electrical signal output from the imaging unit 102. Subsequently, the signal processing unit 103 outputs the RAW image data. The signal processing includes an A/D conversion process for converting an analog electrical signal into a digital electrical signal, a correction process in which various corrections are performed, and the like. In the correction process, an error due to defects of an imaging sensor (a CCD, a CMOS, or the like) included in the imaging unit 102, an error due to optical variations in the lens of the lens unit 101, and the like are reduced.

As described above, an analog electrical signal obtained by the first imaging and an analog electrical signal obtained by the second imaging are alternately output from the imaging unit 102. Therefore, RAW-HDR moving image data is output from the signal processing unit 103. RAW-HDR moving image data is moving image data that includes RAW image data as image data of each frame. RAW-HDR moving image data is also moving image data in which a frame pair including a first frame obtained by the first imaging and a second frame obtained by the second imaging is repeated.

The output unit 104 outputs the RAW-HDR moving image data output from the signal processing unit 103 to the reproducing apparatus 200 at a predetermined frame rate. In a case of outputting the RAW-HDR moving image data, the output unit 104 adds, to each frame (each piece of RAW image data) of the RAW-HDR moving image data, metadata including HDR meta information that is information related to the frame. In the present embodiment, the HDR meta information includes HDR identification information (moving image identification information), pair identification information, frame identification information, and exposure time information.

HDR identification information is information indicating whether or not moving image data output from the output unit 104 is HDR moving image data (moving image data in which a frame pair including a first frame obtained by the first imaging and a second frame obtained by the second imaging is repeated). In the present embodiment, since RAW-HDR moving image data is output from the imaging apparatus 100, HDR identification information may also be described as "information indicating that the moving image data output from the output unit 104 is RAW-HDR moving image data". HDR identification information may or may not be added to all of the frames of moving image data. For example, HDR identification information may only be added to a leading frame of moving image data. A leading frame may be detected in accordance with, for example, a user operation for instructing start of imaging.

Pair identification information is information that identifies a frame pair in the HDR moving image data (RAW-HDR moving image data) output from the output unit 104. For example, a same identifier is added as pair identification information to each of a first frame and a second frame included in a single frame pair. In a case of using such identifiers, pair identification information is added to all of the frames of the HDR moving image data. With respect to a first frame, information indicating a second frame included in a same frame pair as the first frame may be added as pair identification information. With respect to a second frame, information indicating a first frame included in a same frame pair as the second frame may be added as pair identification information. In a case of using such information, pair identification information is added to at least one of the first frame and the second frame of moving image data.

Frame identification information and exposure time information are added to all of the frames of HDR moving image data. Frame identification information is information that identifies a first frame and a second frame in the HDR moving image data (RAW-HDR moving image data) output from the output unit 104. Specifically, frame identification information is information indicating whether a corresponding frame is a first frame or a second frame. Exposure time information is information indicating an exposure time of each frame of the moving image data output from the output unit 104. Specifically, exposure time information is information indicating an exposure time of a corresponding frame.

Moreover, the HDR meta information may include information other than HDR identification information, pair identification information, frame identification information, and exposure time information. For example, the HDR meta information may include information such as a time code.

Figure 3:
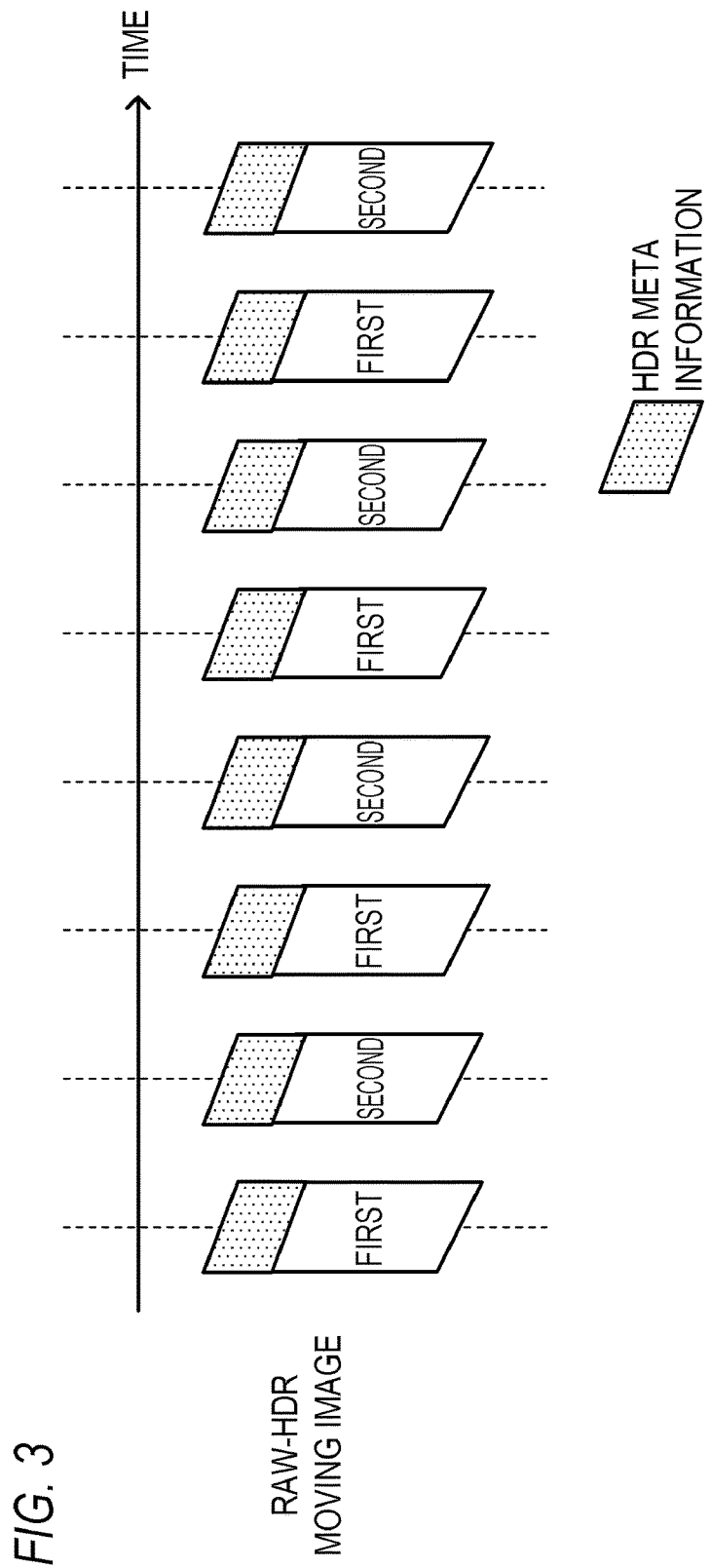
FIG. 3 is a diagram showing an example of RAW-HDR moving image data according to the first embodiment.

FIG. 3 is a diagram showing an example of RAW-HDR moving image data output from the imaging apparatus 100. As shown in FIG. 3, first frames and second frames are alternately arranged in RAW-HDR moving image data. In addition, HDR meta information is added to each frame. The imaging apparatus 100 (the output unit 104) and the reproducing apparatus 200 are connected to each other in a wired or wireless manner. As a cable for connecting the imaging apparatus 100 and the reproducing apparatus 200 to each other, for example, a serial digital interface (SDI) cable, a high-definition multimedia interface (HDMI) cable, or the like is used. In a case where the imaging apparatus 100 is connected to the reproducing apparatus 200 using an SDI cable, for example, HDR meta information is added to an ancillary area that is a vertical blanking region. Moreover, in a case where the imaging apparatus 100 and the reproducing apparatus 200 are integrated with each other, RAW-HDR moving image data may be transmitted from the output unit 104 to the reproducing apparatus 200 via an internal bus.

The user I/F unit 105 receives user operations with respect to the imaging apparatus 100. In addition, the user I/F unit 105 outputs operation information indicating a user operation performed with respect to the imaging apparatus 100 to the control unit 106. For example, in a case where a shutter button (not shown) is pressed, the user I/F unit 105 outputs operation information indicating that the shutter button has been pressed to the control unit 106.

The control unit 106 controls operations of the respective functional units included in the imaging apparatus 100. For example, the control unit 106 controls operations of the respective functional units by outputting instructions to the respective functional units based on operation information from the user I/F unit 105. Specifically, in a case where operation information indicating that the shutter button has been pressed is output from the user I/F unit 105, the control unit 106 notifies the imaging unit 102 of exposure times of the first frame and the second frame and instructs the imaging unit 102 to start imaging.

Figure 4:
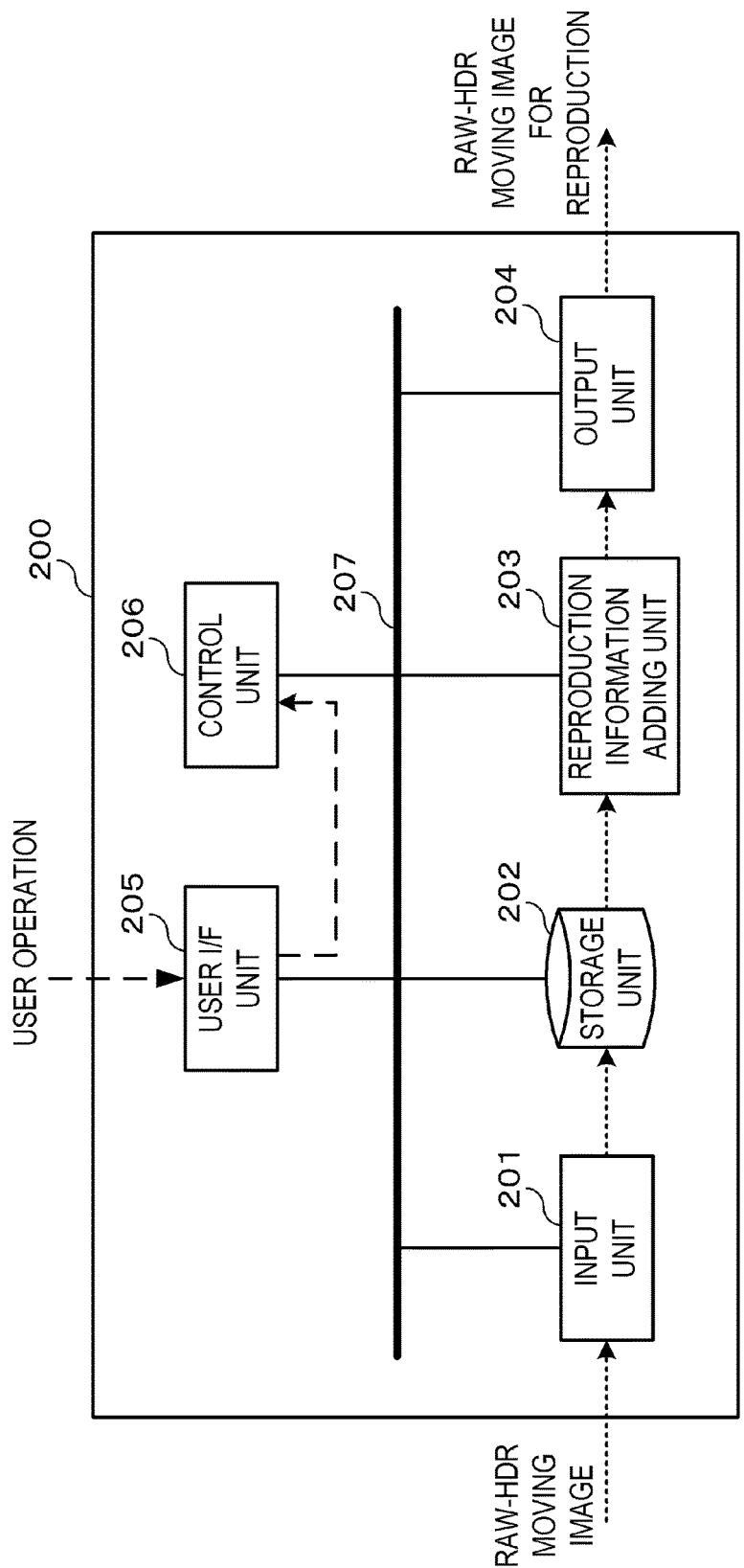
FIG. 4 is a block diagram showing an example of a functional configuration of a reproducing apparatus according to the first embodiment.

FIG. 4 is a block diagram showing an example of a functional configuration of the reproducing apparatus 200. As shown in FIG. 4, the reproducing apparatus 200 at least includes an input unit 201, a storage unit 202, a reproduction information adding unit 203, an output unit 204, a user I/F unit 205, and a control unit 206. These functional units are connected to each other by an internal bus 207. Transmission and reception of data among the functional units are performed using the internal bus 207. Operations of the respective functional units are controlled by the control unit 206.

The input unit 201 acquires the RAW-HDR moving image data output from the imaging apparatus 100 at a predetermined frame rate and stores the RAW-HDR moving image data in the storage unit 202. The storage unit 202 is a storage device capable of storing moving image data. As the storage unit 202 for example, a magnetic disk, an optical disk, a semiconductor memory, or the like is used. Moreover, the storage unit 202 may be a storage device that is not attachable to and detachable from the reproducing apparatus 200 or may be a storage device that is attachable to and detachable from the reproducing apparatus 200.

The user I/F unit 205 receives user operations with respect to the reproducing apparatus 200. In addition, the user I/F unit 205 outputs operation information indicating a user operation performed with respect to the reproducing apparatus 200 to the control unit 206. For example, in a case where a recording start button (not shown) is pressed, the user I/F unit 205 outputs operation information indicating that the recording start button has been pressed to the control unit 206. In a case where a reproduction start button (not shown) is pressed, the user I/F unit 205 outputs operation information indicating that the reproduction start button has been pressed to the control unit 206. In a case where a pause button (not shown) is pressed, the user I/F unit 205 outputs operation information indicating that the pause button has been pressed to the control unit 206. In a case where a slow reproduction button (not shown) is pressed, the user I/F unit 205 outputs operation information indicating that the slow reproduction button has been pressed to the control unit 206. In a case where a frame-by-frame button (not shown) is pressed, the user I/F unit 205 outputs operation information indicating that the frame-by-frame button has been pressed to the control unit 206. In a case where a reproduction stop button (not shown) is pressed, the user I/F unit 205 outputs operation information indicating that the reproduction stop button has been pressed to the control unit 206.

The control unit 206 controls operations of the respective functional units included in the reproducing apparatus 200. For example, the control unit 206 controls operations of the respective functional units by outputting instructions to the respective functional units based on operation information from the user I/F unit 205. Specifically, in a case where operation information indicating that the recording start button has been pressed is output from the user I/F unit 205, the control unit 206 instructs the input unit 201 to record moving image data. In a case where operation information indicating that the reproduction start button has been pressed is output from the user I/F unit 205, the control unit 206 instructs the reproduction information adding unit 203 to perform normal reproduction. Accordingly, normal reproduction is set as a reproduction method. In a case where operation information indicating that the pause button has been pressed is output from the user I/F unit 205, the control unit 206 instructs the reproduction information adding unit 203 to perform pause reproduction. Accordingly, pause reproduction is set as a reproduction method. In a case where operation information indicating that the slow reproduction button has been pressed is output from the user I/F unit 205, the control unit 206 instructs the reproduction information adding unit 203 to perform slow reproduction. Accordingly, slow reproduction is set as a reproduction method. In a case where operation information indicating that the frame-by-frame button has been pressed is output from the user I/F unit 205, the control unit 206 instructs the reproduction information adding unit 203 to perform frame-by-frame reproduction. In a case where operation information indicating that the reproduction stop button has been pressed is output from the user I/F unit 205, the control unit 206 instructs the reproduction information adding unit 203 to stop reproduction.

Based on the reproduction method set in accordance with an instruction from the control unit 206, the reproduction information adding unit 203 generates RAW-HDR moving image data for reproduction from the RAW-HDR moving image data recorded in the storage unit 202. Subsequently, the reproduction information adding unit 203 outputs the RAW-HDR moving image data for reproduction at a predetermined frame rate. In addition, in a case of outputting the RAW-HDR moving image data for reproduction, the reproduction information adding unit 203 adds metadata including reproduction information to each frame of the RAW-HDR moving image data for reproduction. Reproduction information is information related to the set reproduction method.

For example, in a case where normal reproduction is instructed by the control unit 206, the reproduction information adding unit 203 sequentially outputs respective frames of the RAW-HDR moving image data recorded in the storage unit 202. At this point, reproduction information indicating normal reproduction is added to each frame. In a case where pause reproduction is instructed, the reproduction information adding unit 203 repetitively outputs a frame pair acquired (or output) at the moment pause reproduction was instructed. At this point, reproduction information indicating pause reproduction is added to each frame. In a case where frame-by-frame reproduction is instructed after pause reproduction is instructed, the reproduction information adding unit 203 reads out a frame pair immediately following a frame pair acquired (or output) at the moment pause reproduction was instructed from the storage unit 202 and repetitively outputs the read-out frame pair. In this case, reproduction information indicating pause reproduction is also added to each frame. In a case where slow reproduction is instructed by the control unit 206, the reproduction information adding unit 203 respectively outputs, N-number of times (where N is an integer equal to or larger than 2), each frame of the RAW-HDR moving image data recorded in the storage unit 202. At this point, reproduction information indicating slow reproduction is added to each frame. In a case where reproduction stop is instructed, the reproduction information adding unit 203 stops output of the RAW-HDR moving image data for reproduction.

Normal reproduction is a reproduction method in which a moving image is reproduced at a normal reproduction speed (a second reproduction speed). Pause reproduction and slow reproduction are reproduction methods in which a moving image is reproduced at a slower production speed (a first reproduction speed) that is lower than the normal reproduction speed. Pause reproduction is a reproduction method in which a frame pair that is a reproduction object is not updated. In this manner, in the pre sent embodiment, a plurality of reproduction methods with different reproduction speeds are used. Therefore, reproduction information may also be described as "information related to reproduction speed". Information indicating a reproduction speed may be used as reproduction information. Moreover, reproduction methods and reproduction information are not limited to the above. For example, reverse reproduction in which frames are reproduced starting at a frame captured at a latest imaging time may be used as the reproduction method.

Figure 5:
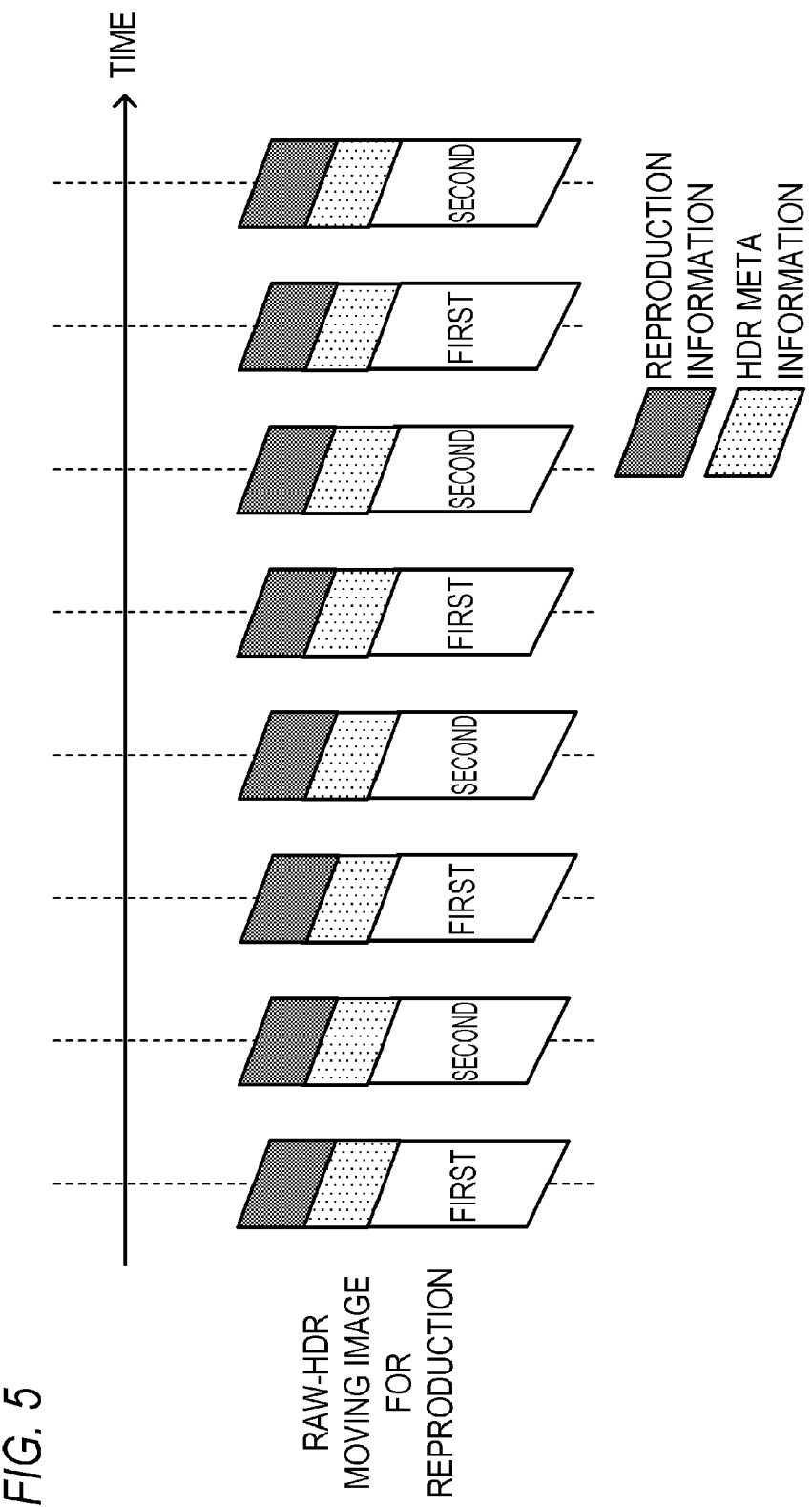
FIG. 5 is a diagram showing an example of RAW-HDR moving image data for reproduction according to the first embodiment.

The output unit 204 outputs the RAW-HDR moving image data for reproduction output from the reproduction information adding unit 203 to the developing apparatus 300 at a predetermined frame rate. FIG. 5 is a diagram showing an example of RAW-HDR moving image data for reproduction output from the reproducing apparatus 200. As shown in FIG. 5, first frames and second frames are alternately arranged in RAW-HDR moving image data for reproduction. In addition, HDR meta information and reproduction information are added to each frame. The reproducing apparatus 200 (the output unit 204) and the developing apparatus 300 are connected to each other in a wired or wireless manner. As a cable for connecting the reproducing apparatus 200 and the developing apparatus 300 to each other, for example, an SDI cable, an HDMI cable, or the like is used. In a case where the reproducing apparatus 200 is connected to the developing apparatus 300 using an SDI cable, for example, reproduction information is added to an ancillary area that is a vertical blanking region. Moreover, in a case where the reproducing apparatus 200 and the developing apparatus 300 are integrated with each other, RAW-HDR moving image data for reproduction may be transmitted from the output unit 204 to the developing apparatus 300 via an internal bus.

Figure 6:
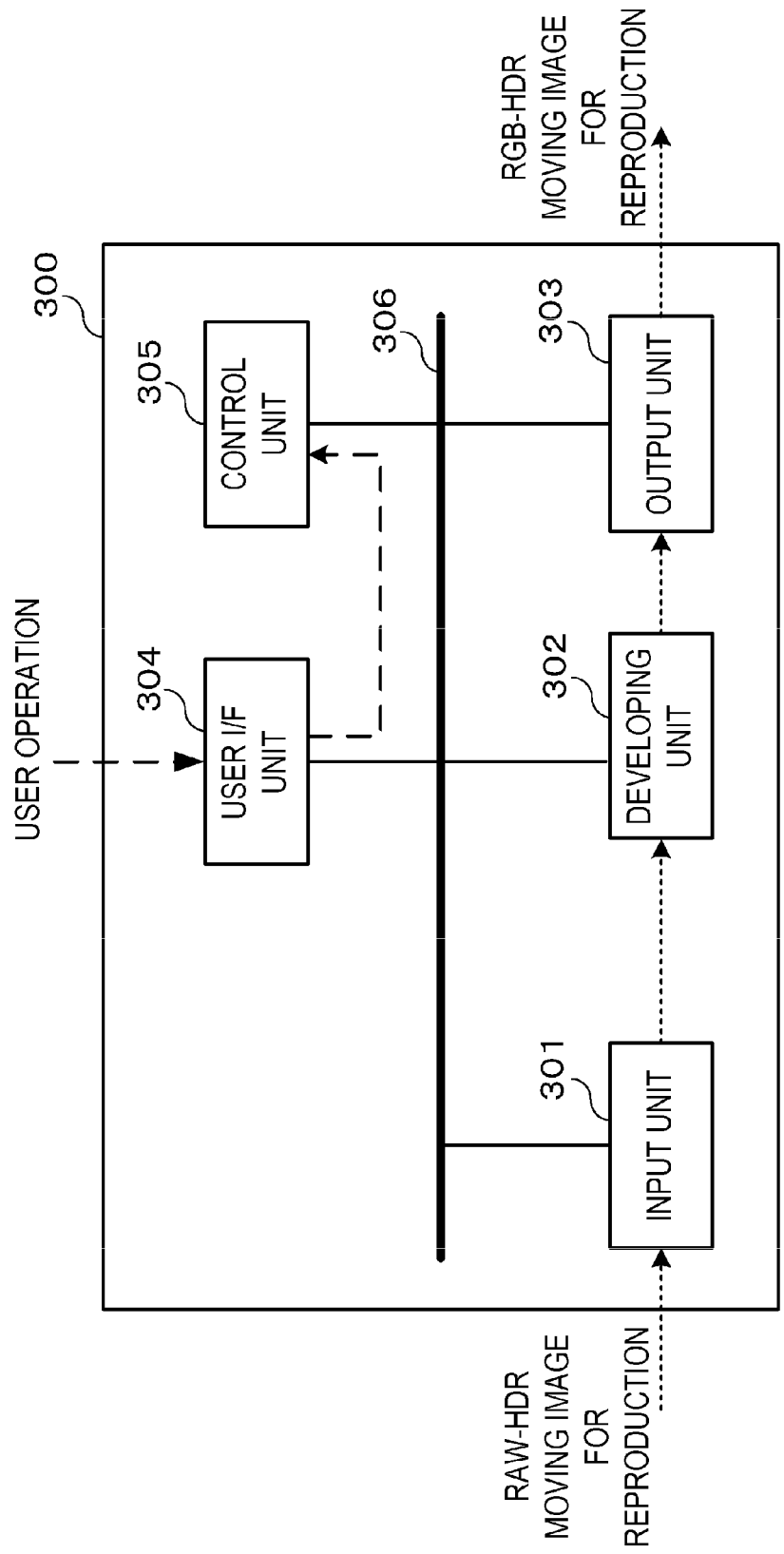
FIG. 6 is a block diagram showing an example of a functional configuration of a developing apparatus according to the first embodiment.

FIG. 6 is a block diagram showing an example of a functional configuration of the developing apparatus 300. As shown in FIG. 6, the developing apparatus 300 at least includes an input unit 301, a developing unit 302, an output unit 303, a user I/F unit 304, and a control unit 305. These functional units are connected to each other by an internal bus 306. Transmission and reception of data among the functional units are performed using the internal bus 306. Operations of the respective functional units are controlled by the control unit 305.

The input unit 301 acquires the RAW-HDR moving image data for reproduction output from the reproducing apparatus 200 at a predetermined frame rate and outputs the RAW-HDR moving image data for reproduction to the developing unit 302. The developing unit 302 performs a developing process (a Debayer process) on the RAW-HDR moving image data for reproduction output from the input unit 301. RAW image data has a pixel value dependent on an element array of the imaging unit 102. Due to the developing process, the pixel value of RAW image data is converted into a general pixel value. In the present embodiment, a developing process is performed which converts the pixel value of RAW image data into an RGB value (sampling number 4:4:4). Accordingly, RGB-HDR moving image data for reproduction which represents a pixel value of RAW-HDR moving image data for reproduction converted into an RGB value is generated. Subsequently, the developing unit 302 outputs the RGB-HDR moving image data for reproduction. Moreover, the pixel value after the developing process is not limited to an RGB value. For example, the pixel value after the developing process may be a YCbCr value.

The output unit 303 outputs the RGB-HDR moving image data for reproduction output from the developing unit 302 to the image display apparatus 400 at a predetermined frame rate. A structure of RGB-HDR moving image data for reproduction is similar to that of RAW-HDR moving image data for reproduction (FIG. 5). In other words, HDR meta information and reproduction information are also added to RGB-HDR moving image data for reproduction. The developing apparatus 300 (the output unit 303) and the image display apparatus 400 are connected to each other in a wired or wireless manner. As a cable for connecting the developing apparatus 300 and the image display apparatus 400 to each other, for example, an SDI cable, an HDMI cable, or the like is used. Moreover, in a case where the developing apparatus 300 and the image display apparatus 400 are integrated with each other, RGB-HDR moving image data for reproduction may be transmitted from the output unit 303 to the image display apparatus 400 via an internal bus.

The user I/F unit 304 receives user operations with respect to the developing apparatus 300. In addition, the user I/F unit 304 outputs operation information indicating a user operation performed with respect to the developing apparatus 300 to the control unit 305. For example, in a case where a developing start button (not shown) is pressed, the user I/F unit 304 outputs operation information indicating that the developing start button has been pressed to the control unit 305.

The control unit 305 controls operations of the respective functional units included in the developing apparatus 300. For example, the control unit 305 controls operations of the respective functional units by outputting instructions to the respective functional units based on operation information from the user I/F unit 304. Specifically, in a case where operation information indicating that the developing start button has been pressed is output from the user I/F unit 304, the control unit 305 instructs the developing unit 302 to start a developing process.

Figure 7:
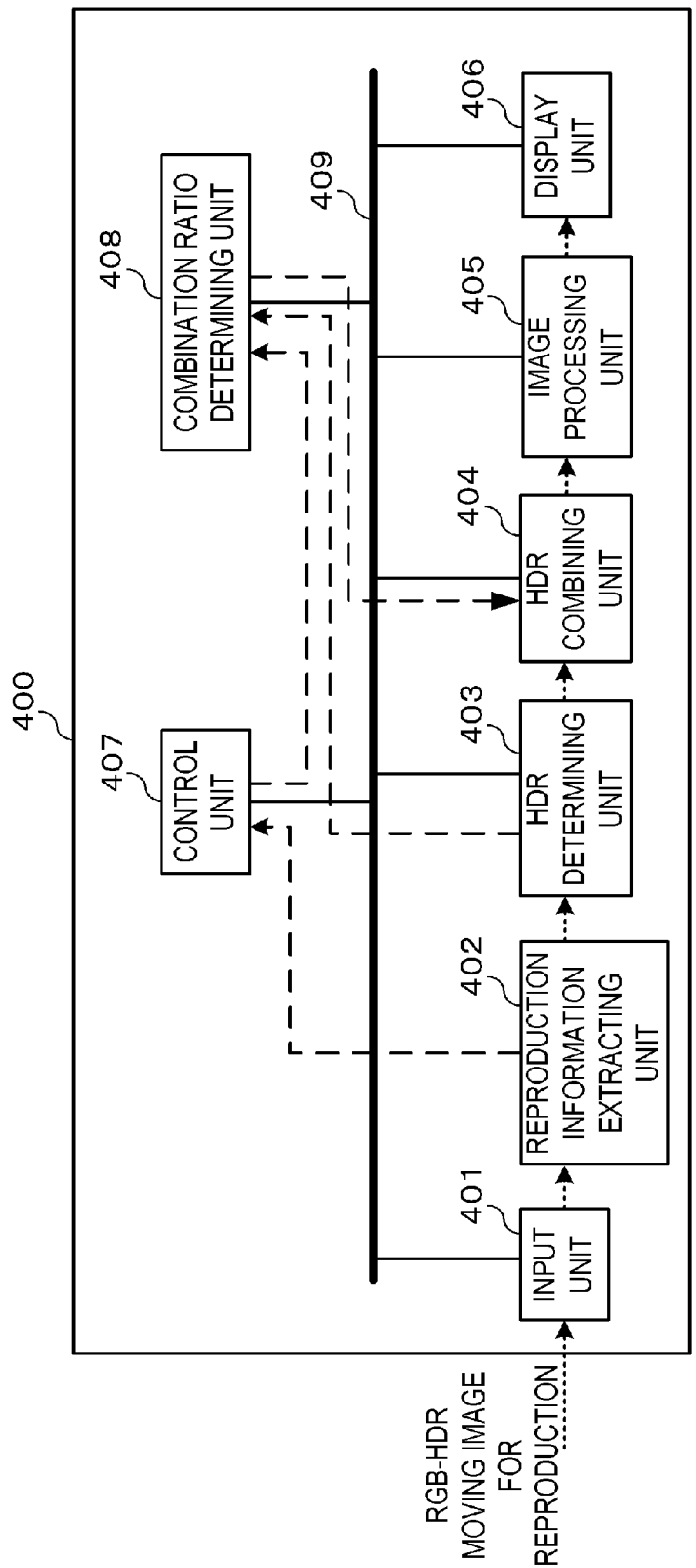
FIG. 7 is a block diagram showing an example of a functional configuration of an image display apparatus according to the first embodiment.

FIG. 7 is a block diagram showing an example of a functional configuration of the image display apparatus 400. As shown in FIG. 7, the image display apparatus 400 at least includes an input unit 401, a reproduction information extracting unit 402, an HDR determining unit 403, an HDR combining unit 404, an image-processing unit 405, a display unit 406, a control unit 407, and a combination ratio determining unit 408. These functional units are connected to each other by an internal bus 409. Transmission and reception of data among the functional units are performed using the internal bus 409. Operations of the respective functional units are controlled by the control unit 407.

The input unit 401 acquires the RGB-HDR moving image data for reproduction output from the developing apparatus 300 at a predetermined frame rate (a first acquisition process). Subsequently, the input unit 401 outputs the acquired RGB-HDR moving image data for reproduction at a predetermined frame rate to the reproduction information extracting unit 402 and the HDR determining unit 403. Moreover, the input unit 401 may acquire moving image data other than HDR moving image data.

Each time frame data (one frame's worth of image data) is output from the input unit 401, the reproduction information extracting unit 402 extracts reproduction information from the frame data (a second acquisition process) and outputs the extracted reproduction information to the control unit 407.

Each time frame data is output from the input unit 401, the HDR determining unit 403 extracts HDR meta information from the frame data. In addition, the HDR determining unit 403 acquires HDR identification information from the extracted HDR meta information (a sixth acquisition process) and determines whether or not the moving image data acquired by the input unit 401 is RGB-HDR moving image data for reproduction in accordance with the HDR identification information (a moving image determining process). In a case where the moving image data acquired by the input unit 401 is not RGB-HDR moving image data for reproduction, the HDR determining unit 403 outputs the frame data from the input unit 401 to the image-processing unit 405. In a case where the moving image data acquired by the input unit 401 is RGB-HDR moving image data for reproduction, the HDR determining unit 403 outputs the frame data from the input unit 401 to the HDR combining unit 404. In addition, in a case where the moving image data acquired by the input unit 401 is RGB-HDR moving image data for reproduction, the HDR determining unit 403 outputs the extracted HDR meta information to the HDR combining unit 404 and the combination ratio determining unit 408.

Moreover, in a case where there is a premise that RGB-HDR moving image data for reproduction is to be input to the image display apparatus 400, the sixth acquisition process and the moving image determining process need not be performed. In addition, a method of performing the moving image determining process is not particularly limited. For example, whether or not moving image data is RGB-HDR moving image data for reproduction may be determined using at least one of pair identification information and frame identification information. In other words, at least one of pair identification information and frame identification information may double as HDR identification information. Since the exposure time of the first frame is relatively long, the first frame is often bright. In addition, since the exposure time of the second frame is relatively short, the second frame is often dark. Therefore, whether or not moving image data acquired by the input unit 401 is RGB-HDR moving image data for reproduction can also be determined based on a change in brightness of the moving image data over time.

The HDR combining unit 404 acquires the HDR meta information output from the HDR determining unit 403 and acquires frame identification information from the acquired HDR meta information (a fourth acquisition process). Subsequently, the HDR combining unit 404 determines whether frame data from the HDR determining unit 403 is data of the first frame or data of the second frame based on the frame identification information (a frame determining process). In other words, in the present embodiment, the first frame and the second frame of the RGB-HDR moving image data for reproduction acquired by the input unit 401 are identified using frame identification information. In addition, the HDR combining unit 404 acquires pair identification information from the acquired HDR meta information (a fifth acquisition process). Subsequently, the HDR combining unit 404 identifies a frame pair of the RGB-HDR moving image data for reproduction acquired by the input unit 401 using pair identification information (a pair identifying process).

In addition, each time a frame pair is acquired, the HDR combining unit 404 performs a combining process for combining the first frame and the second frame of the frame pair and outputs a result of the combining process (combine frame data) to the image-processing unit 405. In the combining process, the first frame and the second frame are combined with weights in accordance with a combination ratio output from the combination ratio determining unit 408. In order to perform the combining process, the HDR combining unit 404 includes a buffer (a frame memory) that stores frame data. HDR combine moving image data is generated by performing the combining process on each frame pair of the RGB-HDR moving image data for reproduction.

In the combining process, for example, the first frame and the second frame are combined using Expression 1 given below. Expression 1 represents a combining process with respect to one pixel position. The combining process using Expression 1 is performed with respect to each pixel position. In Expression 1, K denotes a combination ratio, L1 denotes a brightness value of the first frame, L2 denotes a brightness value of the second frame, and Lc denotes a combination result (a brightness value after the combining process) K is a value of 0 or more and 1 or less.

$$Lc = L2 \times K + L1 \times (1-K) \quad \text{(Expression 1)}$$

Moreover, an order of the first frame and the second frame in RGB-HDR moving image data for reproduction may be set in advance. In addition, in a case where the image display apparatus 400 is aware of the order of the first frame and the second frame in RGB-HDR moving image data for reproduction in advance, the fourth acquisition process and the frame determining process need not be performed. Furthermore, a method of performing the frame determining process is not particularly limited. For example, whether frame data from the HDR determining unit 403 is data of the first frame or data of the second frame may be determined based on brightness of the frame data. Moreover, an order of the first frame and the second frame included in a frame pair may be set in advance. In addition, in a case where the image display apparatus 400 is aware of the order of the first frame and the second frame in a frame pair in advance, the fifth acquisition process and the pair determining process need not be performed.

The image-processing unit 405 generates processed frame data by performing predetermined image-processing on the frame data output from the HDR determining unit 403 or the combine frame data output from the HDR combining unit 404. Subsequently, the image-processing unit 405 outputs the generated processed frame data to the display unit 406. The image-processing unit 405 performs the processing described above each time frame data (combine frame data) is input to the image-processing unit 405. As the predetermined image-processing, for example, a white brightness changing process for changing brightness of white, a gradation changing process for changing a gradation value, a chromaticity changing process for changing chromaticity, or the like is performed.

Moreover, due to a difference in combination ratios between pieces of combine frame data, a significant change in brightness such as combine frame data becoming darker or brighter than an immediately previous combine frame may sometimes occur. The image-processing unit 405 may perform image-processing for increasing or reducing brightness in order to reduce such changes in brightness. Specifically, a difference in average brightness values or a difference in peak brightness values (maximum brightness values) between pieces of combine frame data may be monitored, and in a case where the difference is equal to or greater than a predetermined difference, a process for changing white brightness (brightness of white) or the like may be performed so that the difference becomes equal to or smaller than the predetermined difference. Alternatively, for each piece of combine frame data, a combination ratio may be acquired from the combination ratio determining unit 408 and a process for changing brightness or the like may be performed in accordance with the combination ratio.

The display unit 406 displays a moving image in accordance with processed moving image data output from the image-processing unit 405 on a screen. Processed moving image data is moving image data that includes processed frame data as image data of each frame. Specifically, the display unit 406 includes a buffer (a frame memory) that stores frame data and a display panel. Each time processed frame data is output from the image-processing unit 405, the display unit 406 records (overwrites) the processed frame data output from the image-processing unit 405 on the buffer. In addition, the display unit 406 reads out processed frame data from the buffer at a predetermined refresh rate and outputs the read-out processed frame data to the display panel. Respective display elements of the display panel are driven in accordance with the processed frame data input to the display panel and an image in accordance with the processed frame data is displayed. As the display panel, for example, a liquid crystal panel, an organic EL panel, a plasma panel, or the like is used.

The control unit 407 controls operations of the respective functional units included in the image display apparatus 400. For example, the control unit 407 controls operations of the combination ratio determining unit 408 by outputting reproduction information output from the reproduction information extracting unit 402 to the combination ratio determining unit 408. Alternatively, the control unit 407 may generate information based on the reproduction information output from the reproduction information extracting unit 402 and output the generated information instead of the reproduction information. For example, the control unit 407 may generate information indicating whether or not a current reproduction method is pause reproduction based on the reproduction information.

The combination ratio determining unit 408 determines a combination ratio K based on the reproduction information from the control unit 407. As indicated by Expression 1 given earlier, in the present embodiment, a weight of the second frame is determined as the combination ratio K. In the present embodiment, the combination ratio determining unit 408 determines whether or not a current reproduction method is pause reproduction based on the reproduction information. In addition, in accordance with a result of determination of the current reproduction method, the combination ratio determining unit 408 determines the combination ratio K as follows. The combination ratio determining unit 408 outputs the determined combination ratio K to the HDR combining unit 404.

In a case where current reproduction method is normal reproduction: K=0.5

In a case where current reproduction method is pause reproduction: K=0.8

As described above, in the present embodiment, in a case where the current reproduction method is pause reproduction, the combination ratio K is determined so that a larger value than a case where the current reproduction method is normal reproduction is used as the weight of the second frame. Using a large value as the weight of the second frame in a case where the current reproduction method is pause reproduction enables image data representing an image with a high perceived focus of a subject to be obtained as combine frame data. The combination ratio K in a case where the current reproduction method is normal reproduction is a reference value (a default value) and is a value capable of expressing a natural motion of the subject during normal reproduction. A value of the combination ratio K corresponding to a reproduction method may be a fixed value set in advance by a manufacturer or a value that can be changed by the user.

Moreover, the values of the combination ratio K are not limited to the values (0.5 and 0.8) described above. The combination ratio K in a case where the current reproduction method is normal reproduction may be larger or smaller than 0.5. The combination ratio K in a case where the current reproduction method is pause reproduction may be larger or smaller than 0.8. For example, 1 may be used as the combination ratio K in a case where the current reproduction method is pause reproduction. In other words, in a case where the current reproduction method is pause reproduction, 0 may be used as a combination ratio (weight) of the first frame and 1 may be used as the combination ratio of the second frame. In this case, a selecting process for selecting and outputting only the second frame among the first frame having a long exposure time and the second frame having a short exposure time may be selected and a combining process need not be performed.

Alternatively, a value other than the weight of the second frame may be determined as the combination ratio K. For example, the weight of the first frame may be determined as the combination ratio K. A proportion of the weight of the second frame relative to the weight of the first frame may be determined as the combination ratio K. A proportion of the weight of the first frame relative to the weight of the second frame may be determined as the combination ratio K.

Moreover, a reference value may or may not be used as the combination ratio K in a case where the current reproduction method is not pause reproduction. For example, in a case where the current reproduction method is slow reproduction, the combination ratio K may be determined so that a larger value than a case where the current reproduction method is normal reproduction is used as the weight of the second frame. In a case where the current reproduction method is slow reproduction, the combination ratio K may be determined so that a same value as in a case where the current reproduction method is pause reproduction is used as the weight of the second frame. In a case where the current reproduction method is slow reproduction, the combination ratio K may be determined so that a larger value than a case where the current reproduction method is normal reproduction and a smaller value than a case where the current reproduction method is pause reproduction is used as the weight of the second frame.

Moreover, methods of a determining process for determining the combination ratio K are not limited to the methods described above. For example, in a case where the current reproduction method is pause reproduction (or slow reproduction), the combination ratio K may be determined (adjusted) based on brightness of the first frame and the second frame (brightness of frame data from the HDR determining unit 403). In a case where the current reproduction method is pause reproduction (or slow reproduction), the combination ratio K may be determined based on exposure times of the first frame and the second frame. In a case where a difference between exposure times of the first frame and the second frame is small, an increase in perceived focus due to an increase in the weight of the second frame is small. Therefore, in a case where the difference between exposure times of the first frame and the second frame is smaller than a first threshold, the combination ratio K may be determined so that a value closer to a reference value than a case where the difference between exposure times is equal to or greater than the first threshold is used as the weight of the second frame. Specifically, the combination ratio K may be determined as follows. Accordingly, a change in perceived focus due to a difference in reproduction methods can be reduced and a sense of discomfort that is felt by the user can be reduced. In these methods, for example, exposure time information is acquired from HDR meta information (a third acquisition process) and an exposure time indicated by the exposure time information is used. The first threshold may be a fixed value set in advance by a manufacturer or a value that can be changed by the user.

In a case where current reproduction method is normal reproduction: K=0.5

In a case where current reproduction method is pause reproduction and,
the difference in exposure times is equal to or greater than the first threshold: K=0.8

In a case where current reproduction method is pause reproduction and, the difference in exposure times is smaller than the first threshold: K=0.6

Figure 8:
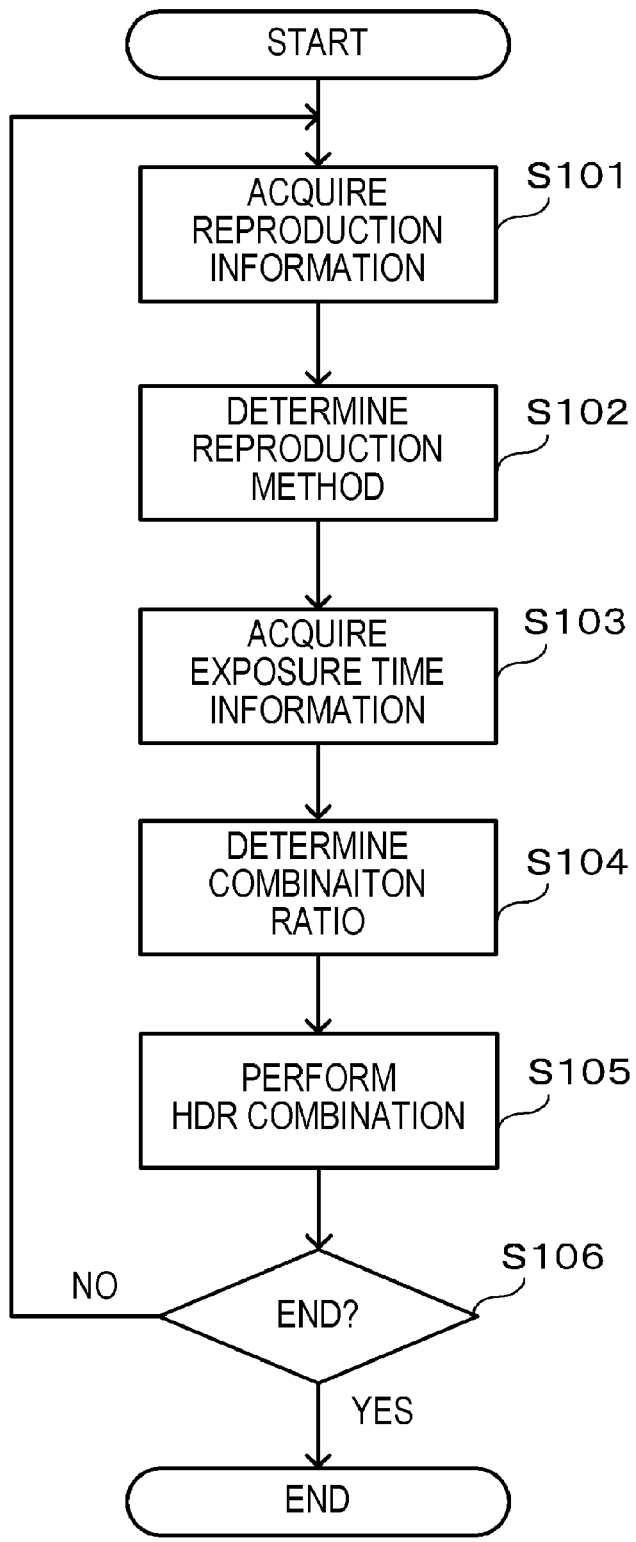
FIG. 8 is a flow chart showing an example of operations of the image display apparatus according to the first embodiment.

FIG. 8 is a flow chart showing an example of operations of the image display apparatus 400. In this case, an example of a case where RGB-HDR moving image data for reproduction is input to the image display apparatus 400 will be described.

First, the control unit 407 acquires reproduction information from the reproduction information extracting unit 402 and outputs the acquired reproduction information to the combination ratio determining unit 408 (S101). Next, the combination ratio determining unit 408 determines whether or not a current reproduction method is pause reproduction based on the reproduction information output from the control unit 407 (S102). In addition, the combination ratio determining unit 408 acquires exposure time information of the first frame and the second frame from the HDR determining unit 403 (S103). Next, the combination ratio determining unit 408 determines the combination ratio K based on a result of the determination of S102 and the exposure time information acquired in S103 (S104). In addition, the HDR combining unit 404 combines the first frame and the second frame using the combination ratio K determined in S104 (S105). Processes from S101 to S105 are repetitively performed for respective frame pairs of the RGB-HDR moving image data for reproduction (S106).

Figure 9A:
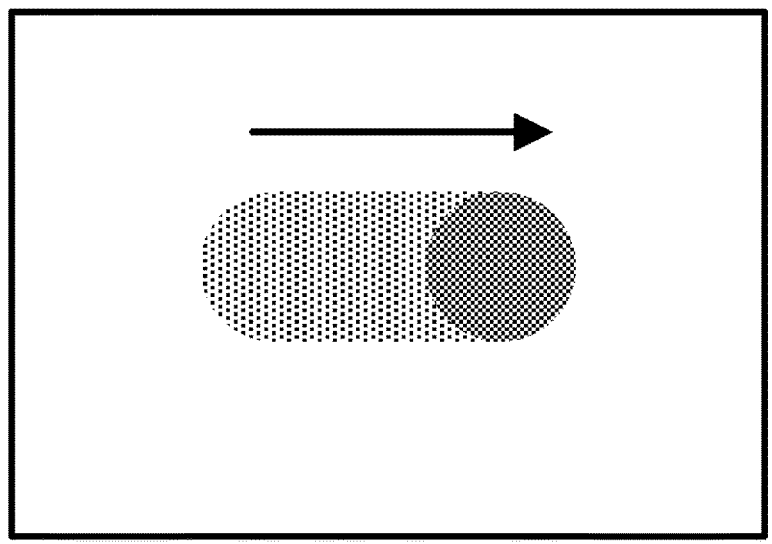
FIGS. 9A and 9B are diagrams showing examples of a display image according to the first embodiment.
Figure 9:
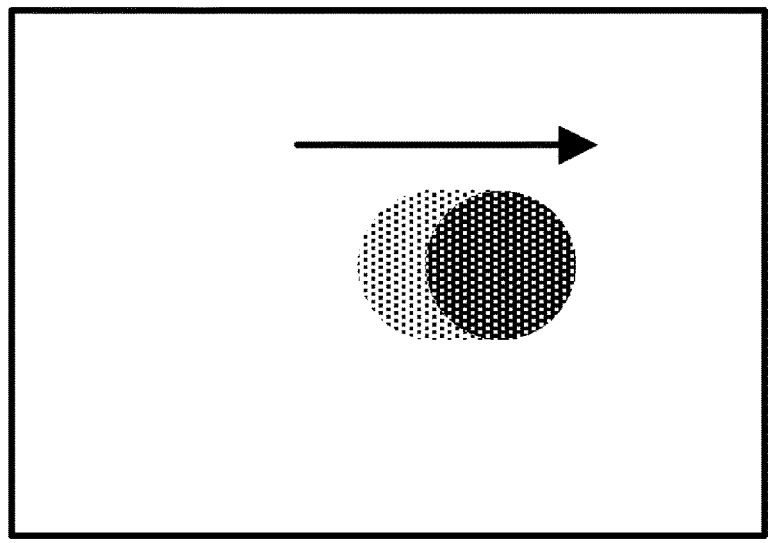

FIGS. 9A and 9B are diagrams showing examples of a display image (an image displayed on a screen) according to the present embodiment. The display images in FIGS. 9A and 9B are images displayed in accordance with combine frame data. In a motion capture work flow, first, normal reproduction is set and a moving image is checked by the user. In this case, a reference value is used as the combination ratio K. As a result, as shown in FIG. 9A, an image that retains motion blur of a subject to a certain degree is displayed. Natural motion can be expressed by displaying an image that retains motion blur to a certain degree. Subsequently, slow reproduction or pause reproduction is set or frame-by-frame reproduction is performed, for example, in order to select combine frame data to be extracted as still image data. In this case, a value larger than the reference value is used as the combination ratio K (the weight of the second frame). As a result, as shown in FIG. 9B, an image with a sharp perceived focus of the subject is displayed. Displaying an image with a sharp perceived focus enables the user to readily and appropriately select combine frame data to be extracted as still image data. A frame pair to be used to generate still image data may be extracted instead of combine frame data.

As described above, according to the present embodiment, a combination ratio that is used in a case of combining a first frame and a second frame is automatically determined based on a reproduction method of HDR moving image data. Accordingly, HDR combine moving image data with a preferable degree of motion blur of a subject (a perceived focus of a subject) can be readily obtained. Specifically, the inconvenience of a user of changing combination ratios each time the reproduction method is changed can be omitted and work time of the user or the burden on the user can be reduced (improvement of work efficiency). In addition, in the motion capture work flow, the user can readily select preferable combine frame data or a preferable frame pair in a short period of time.

Moreover, while an example in which HDR identification information, pair identification information, frame identification information, exposure time information, reproduction information, and the like are transmitted as metadata has been described in the present embodiment, this example is not restrictive. For example, at least any of HDR identification information, pair identification information, frame identification information, exposure time information, and reproduction information may be transmitted separately from moving image data. At least any of HDR identification information, pair identification information, frame identification information, exposure time information, and reproduction information may be acquired in accordance with a user operation. Examples of a user operation include a user operation with respect to the imaging apparatus, a user operation with respect to the reproducing apparatus, and a user operation with respect to the image display apparatus.

Moreover, while an example in which two frames including a first frame and a second frame are combined has been described in the present embodiment, this example is not restrictive. HDR moving image data may be moving image data in which a group of frames including three or more frames is repeated. For example, moving image data may be used in which a group of three frames including a frame captured with short-time exposure, a frame captured with normal exposure, and a frame captured with long-time exposure is repeated. In this case, three or more frames included in the group of frames may be combined. In addition, the first frame and the second frame need not be consecutive in HDR moving image data.

Second Embodiment

Hereinafter, an image display apparatus and an image-processing method according to a second embodiment of the present invention will be described. In the present embodiment, a method of determining the combination ratio K differs from that of the first embodiment. Hereinafter, configurations and processes that differ from those of the first embodiment will be described in detail and configurations and processes that are the same as those of the first embodiment will not be described. A configuration of an image display system according to the present embodiment is the same as in the first embodiment. In addition, configurations of the imaging apparatus, the reproducing apparatus, and the developing apparatus according to the present embodiment are also the same as in the first embodiment.

Figure 10:
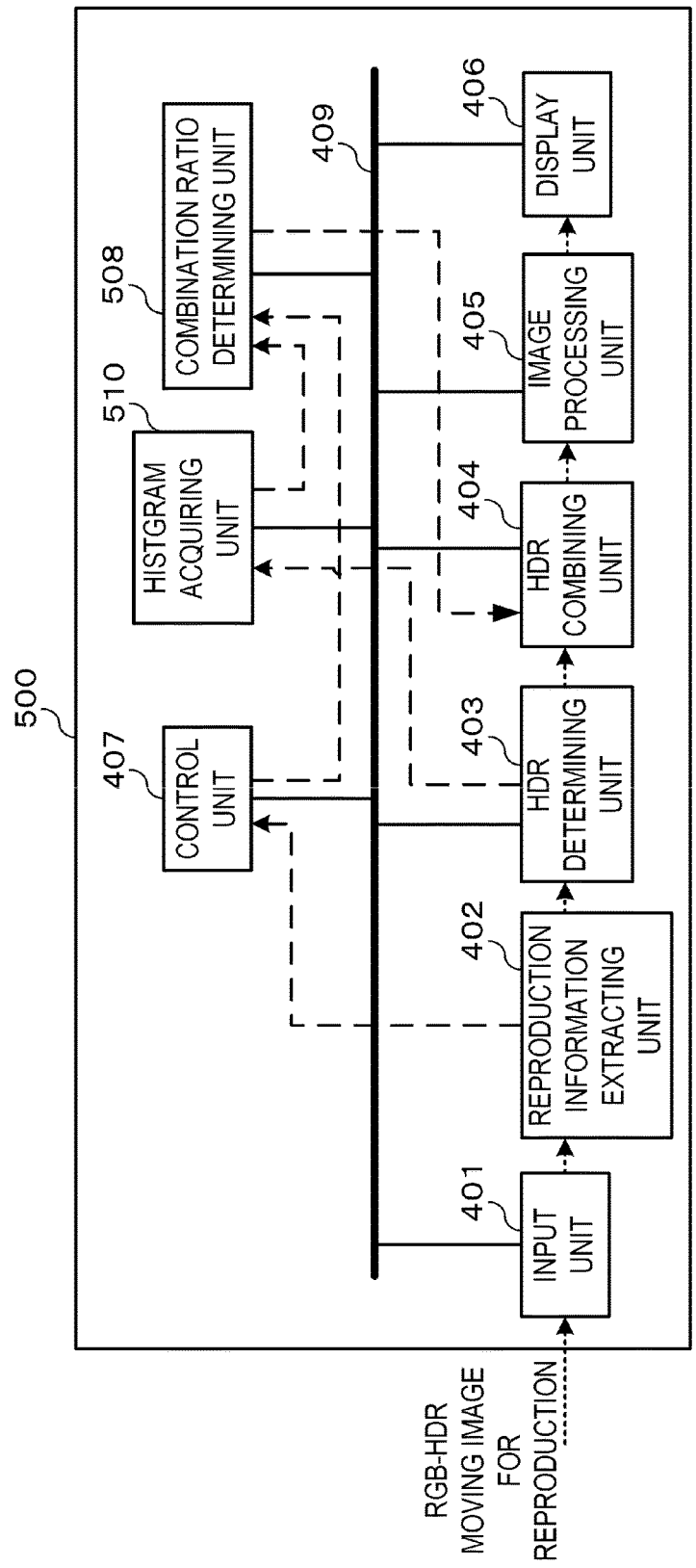
FIG. 10 is a block diagram showing an example of a functional configuration of an image display apparatus according to a second embodiment.

FIG. 10 is a block diagram showing an example of a functional configuration of an image display apparatus 500 according to the present embodiment. As shown in FIG. 10, the image display apparatus 500 at least includes the input unit 401, the reproduction information extracting unit 402, the HDR determining unit 403, the HDR combining unit 404, the image-processing unit 405, the display unit 406, the control unit 407, a combination ratio determining unit 508, and a histogram acquiring unit 510. These functional units are connected to each other by the internal bus 409. Transmission and reception of data among the functional units are performed using the internal bus 409. Operations of the respective functional units are controlled by the control unit 407. Moreover, in FIG. 10, same functional units as in the first embodiment (FIG. 7) are assigned same reference characters as in the first embodiment and descriptions thereof will be omitted.

In the present embodiment, in a case where moving image data acquired by the input unit 401 is HDR moving image data (RGB-HDR moving image data for reproduction), the HDR determining unit 403 outputs frame data from the input unit 401 to the HDR combining unit 404 and the histogram acquiring unit 510. In addition, the HDR determining unit 403 outputs extracted HDR meta information to the HDR combining unit 404, the combination ratio determining unit 508, and the histogram acquiring unit 510.

The histogram acquiring unit 510 identifies a first frame, a second frame, and a frame pair of the HDR moving image data acquired by the input unit 401 by a method similar to the HDR combining unit 404. In addition, each time a frame pair is acquired, the histogram acquiring unit 510 performs a combining process for combining the first frame and the second frame of the frame pair and acquires a gradation value of each piece of combine frame data (a seventh acquisition process). At this point, a combining process is performed which uses a candidate ratio as the combination ratio K. Specifically, for each of a plurality of candidate ratios, a combining process using the candidate ratio as the combination ratio K is performed. Accordingly, for each of a plurality of candidate ratios, a gradation value of each piece of combine frame data is acquired. A candidate ratio refers to a candidate of the combination ratio K. In order to perform the combining process, the histogram acquiring unit 510 includes a buffer (a frame memory) that stores frame data.

A combining process using a candidate ratio as the combination ratio K may be performed by the HDR combining unit 404. In addition, a process for acquiring a gradation value of each piece of combine frame data generated by the HDR combining unit 404 may be performed as the seventh acquisition process. Furthermore, a value of a candidate ratio may be a fixed value set in advance by a manufacturer or a value that can be changed by the user.

The histogram acquiring unit 510 outputs an acquired gradation value to the combination ratio determining unit 508. In the present embodiment, the histogram acquiring unit 510 generates histogram data representing a numerical value of each gradation value for each of a plurality of candidate ratios. Subsequently, the histogram acquiring unit 510 outputs the plurality of pieces of generated histogram data to the combination ratio determining unit 508. Moreover, since gradation values (histogram data) acquired by the histogram acquiring unit 510 are used to check black defects, information related to large gradation values need not be output to the combination ratio determining unit 508. Therefore, only gradation values equal to or smaller than a fourth threshold may be output to the combination ratio determining unit 508. Histogram data representing a numerical value of each gradation value that is equal to or smaller than the fourth threshold may be output to the combination ratio determining unit 508. The fourth threshold may be a fixed value set in advance by a manufacturer or a value that can be changed by the user.

The combination ratio determining unit 508 determines the combination ratio K based on the reproduction information in a similar manner to the first embodiment. However, in the present embodiment, the combination ratio K is determined based on HDR moving image data input to the input unit 401 so that black defects (crushed gradation of dark portions) due to the combining process do not occur (a black defect suppressing process). A method of performing the black defect suppressing process is not particularly limited. In the present embodiment, the combination ratio determining unit 508 determines a combination ratio based on gradation values (histogram data) acquired by the histogram acquiring unit 510 so that the number of pixels with a gradation value equal to or smaller than a second threshold among pixels of the combine frame data is equal to or smaller than a third threshold. A value that is smaller than the fourth threshold is used as the second threshold.

Moreover, the black defect suppressing process may always be performed or the black defect suppressing process may be performed only in a case where the reproduction method is a specific reproduction method. A black defect is more likely to occur in a case where a large value is used as compared to a case where a small value is used as the weight of the second frame. Therefore, the black defect suppressing process may only be performed in a case where the reproduction method is pause reproduction or slow reproduction. The black defect suppressing process may only be performed in a case where the reproduction method is pause reproduction. The black defect suppressing process may only be performed in a case where the reproduction method is slow reproduction. In addition, the second threshold may be a fixed value set in advance by a manufacturer or a value that can be changed by the user. The third threshold may be a fixed value set in advance by a manufacturer or a value that can be changed by the user.

Figure 11:
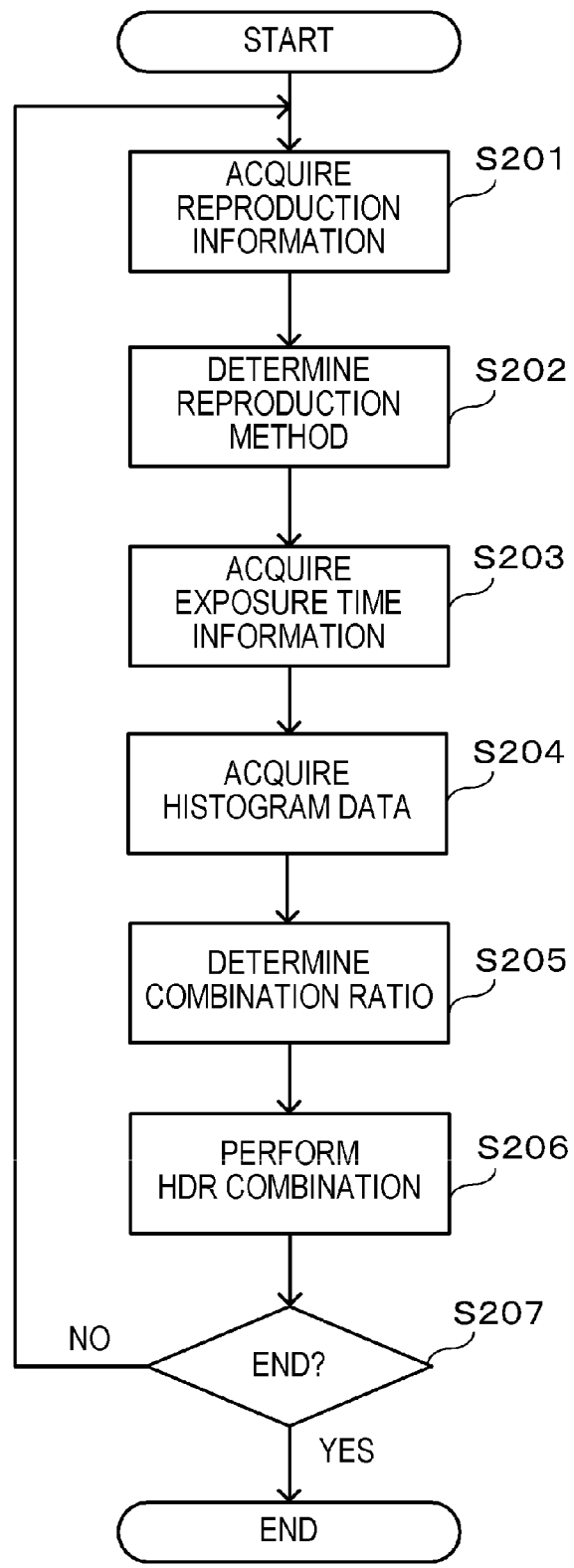
FIG. 11 is a flow chart showing an example of operations of the image display apparatus according to the second embodiment.

FIG. 11 is a flow chart showing an example of operations of the image display apparatus 500. An example of a case where HDR moving image data (RGB-HDR moving image data for reproduction) is input to the image display apparatus 500 will now be described. As shown in FIG. 11, in the present embodiment, processes of S201 to S207 are sequentially performed. The processes of S201 to S203 are the same as the processes of S101 to S103 in FIG. 8 and the processes of S206 and S207 are the same as the processes of S105 and S106 in FIG. 8.

Figure 12A:
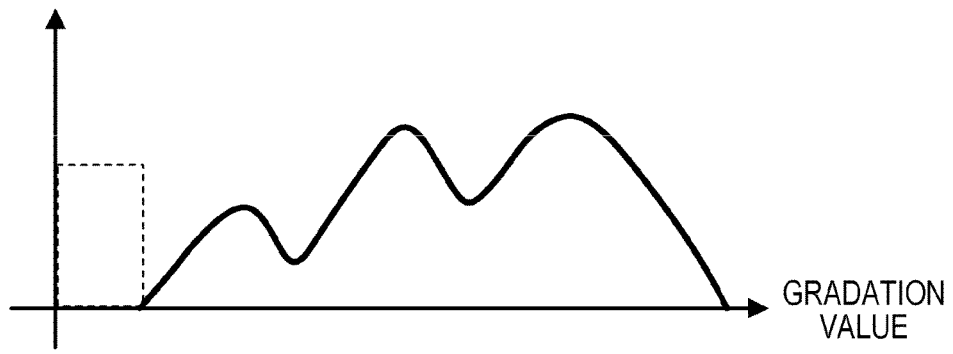
FIGS. 12A to 12C are diagrams showing an example of histogram data according to the second embodiment.
Figure 12B:
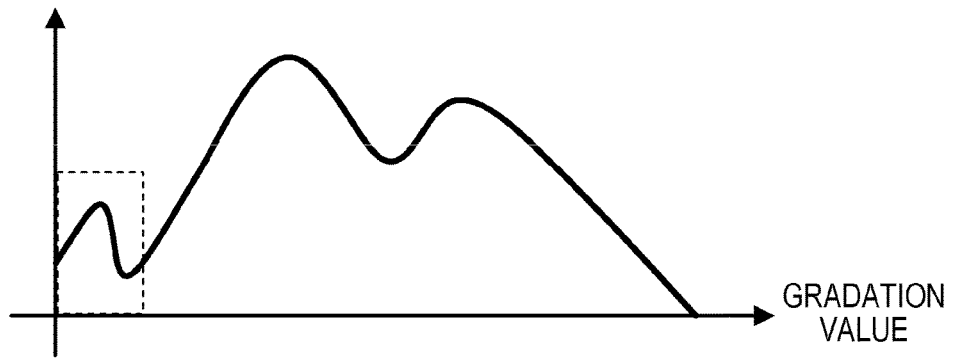
Figure 12C:

In S204, the histogram acquiring unit 510 acquires a plurality of pieces of histogram data corresponding to a plurality of candidate ratios and outputs the plurality of pieces of acquired histogram data to the combination ratio determining unit 508. FIGS. 12A to 12C show examples of histogram data. In FIGS. 12A to 12C, a vertical axis represents the number of pixels and a horizontal axis represents a gradation value. FIG. 12A shows histogram data corresponding to a first candidate ratio. FIG. 12B shows histogram data corresponding to a second candidate ratio that is larger than the first candidate ratio. In addition, FIG. 12C shows histogram data corresponding to a third candidate ratio that is larger than the second candidate ratio. The first candidate ratio, the second candidate ratio, and the third candidate ratio represent weights of the second frame. FIGS. 12A to 12C reveal that, as the weight of the second frame increases, occurrences of black defects increase.

In S205, the combination ratio determining unit 508 determines the combination ratio K based on a result of the determination of S102, the exposure time information acquired in S103, and the histogram data acquired in S204. In a case where the current reproduction method is not pause reproduction, a reference value is determined as the combination ratio K. In a case where the current reproduction method is pause reproduction, a value that is larger than the reference value is determined as the combination ratio K so that the number of pixels with a gradation value equal to or smaller than the second threshold among pixels of the combine frame data is equal to or smaller than the third threshold. A process of S205 in a case where the current reproduction method is pause reproduction will now be described in detail with reference to FIGS. 12A to 12C. In FIG. 12A, there are no pixels having gradation values in a rectangular area depicted by a dashed line. In FIG. 12B, the number of pixels having gradation values in the rectangular area is approximately half of the number equivalent to a size of the rectangular area. In FIG. 12C, the number of pixels having gradation values in the rectangular area is greater than the number equivalent to the size of the rectangular area. In S205, for example, the combination ratio K is determined so that the number of pixels having gradation values in the rectangular area is equal to or smaller than half of the number equivalent to the size of the rectangular area. Therefore, the second candidate ratio corresponding to the histogram data shown in FIG. 12B is determined as the combination ratio K.

As described above, according to the present embodiment, since a combination ratio is automatically determined based on imaging information, an effect similar to that of the first embodiment is achieved. In addition, in the present embodiment, the combination ratio is determined so that occurrences of black defects are suppressed. Accordingly, HDR combine moving image data with higher image quality can be obtained.

Moreover, while an example in which a plurality of candidate ratios are used has been described in the present embodiment, only one candidate ratio may be used. An example of a case where one candidate ratio is used will now be described. A correspondence relationship among the number of pixels with gradation values equal to or smaller than the second threshold, the combination ratio K, and reproduction methods is determined in advance. Subsequently, the combination ratio K is determined based on reproduction information, the gradation values acquired by the histogram acquiring unit 510, and the correspondence relationship described above. Specifically, the combination ratio K corresponding to a combination of the reproduction method represented by the reproduction information and the number of pixels with gradation values acquired by the histogram acquiring unit 510 being equal to or smaller than the second threshold is acquired from the correspondence relationship. In a case where the black defect suppressing process is only performed during pause reproduction, a correspondence relationship between the number of pixels with gradation values equal to or smaller than the second threshold and the combination ratio K may be determined in advance. In this case, the combination ratio K corresponding to the number of pixels with gradation values acquired by the histogram acquiring unit 510 being equal to or smaller than the second threshold may be acquired from the correspondence relationship.

Third Embodiment

Hereinafter, an image display apparatus and an image-processing method according to a third embodiment of the present invention will be described. Hereinafter, configurations and processes that differ from those of the first embodiment will be described in detail and configurations and processes that are the same as those of the first embodiment will not be described. A configuration of an image display system according to the present embodiment is the same as in the first embodiment. In addition, configurations of the imaging apparatus, the reproducing apparatus, and the developing apparatus according to the present embodiment are also the same as in the first embodiment. Moreover, characteristic configurations of the present embodiment described below may be combined with configurations of the second embodiment or configurations of a fourth embodiment (to be described later).

Figure 13:
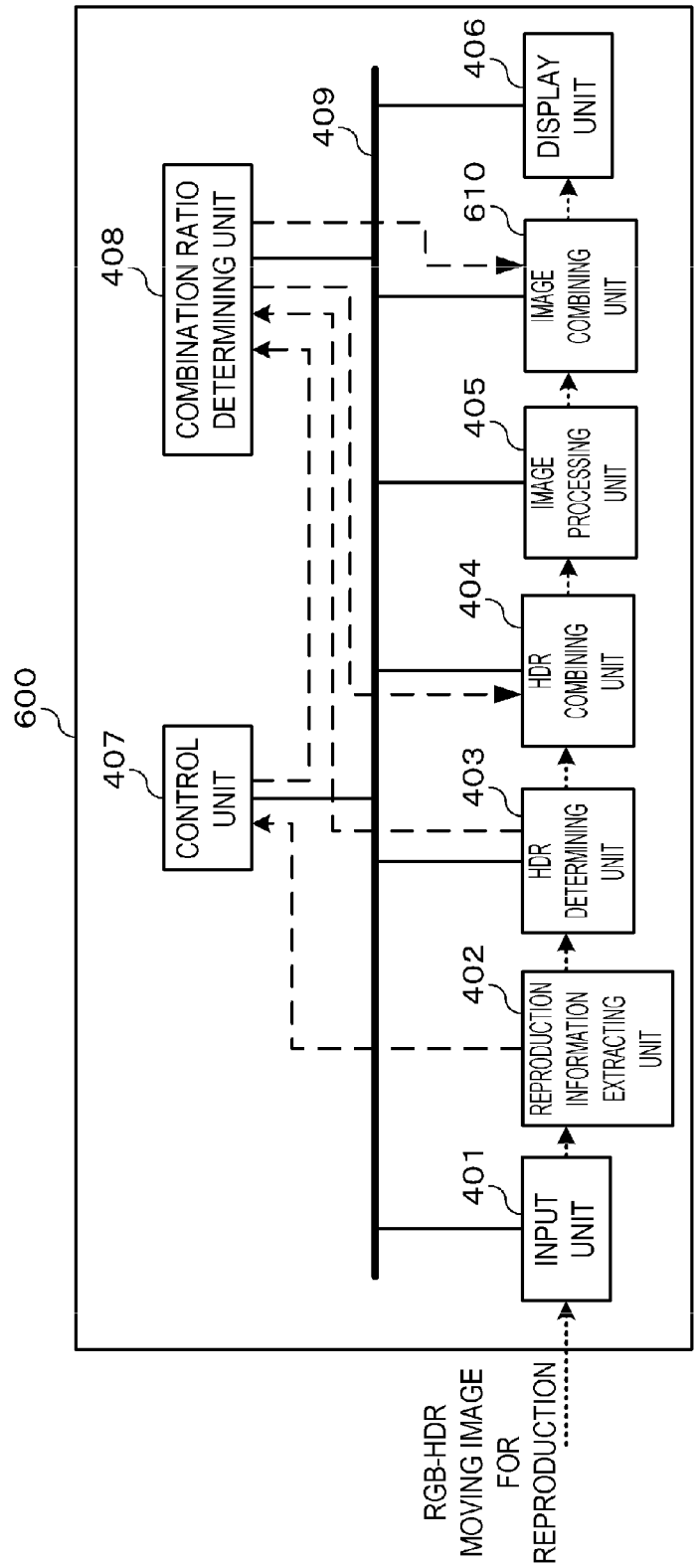
FIG. 13 is a block diagram showing an example of a functional configuration of an image display apparatus according to a third embodiment.

FIG. 13 is a block diagram showing an example of a functional configuration of an image display apparatus 600 according to the present embodiment. As shown in FIG. 13, the image display apparatus 600 at least includes the input unit 401, the reproduction information extracting unit 402, the HDR determining unit 403, the HDR combining unit 404, the image-processing unit 405, the display unit 406, the control unit 407, the combination ratio determining unit 408, and an image combining unit 610. These functional units are connected to each other by the internal bus 409. Transmission and reception of data among the functional units are performed using the internal bus 409. Operations of the respective functional units are controlled by the control unit 407. Moreover, in FIG. 13, same functional units as in the first embodiment (FIG. 7) are assigned same reference characters as in the first embodiment and descriptions thereof will be omitted.

In the present embodiment, the combination ratio determining unit 408 outputs a determined combination ratio K to the HDR combining unit 404 and the image combining unit 610. In addition, the image-processing unit 405 outputs generated processed frame data (first processed frame data) to the image combining unit 610.

The image combining unit 610 notifies the user of the combination ratio K output from the combination ratio determining unit 408. In the present embodiment, the image combining unit 610 includes a buffer (a frame memory) that stores frame data and records (overwrites) first processed frame data output from the image-processing unit 405 on the buffer. In addition, based on the combination ratio K output from the combination ratio determining unit 408 and the first processed frame data recorded on the buffer, the image combining unit 610 generates frame data (second processed frame data) representing an image in which a combination ratio image is superimposed on a processed frame image. A combination ratio image is a graphic image representing a combination ratio and a processed frame image is an image represented by the first processed frame data. Specifically, the image combining unit 610 generates image data (graphic image data) representing a combination ratio image based on the combination ratio K. In addition, the image combining unit 610 generates second processed frame data by combining the graphic image data with the first processed frame data. Subsequently, the image combining unit 610 outputs the generated second processed frame data to the display unit 406. As a result, an image in which the combination ratio image is superimposed on the processed frame image is displayed and the user is notified of the combination ratio. The image combining unit 610 performs the process described above each time processed frame data is output from the image-processing unit 405. Accordingly, moving image data representing a moving image in which a combination ratio image is superimposed on a moving image based on HDR combine moving image data is generated and displayed.

Figure 14:
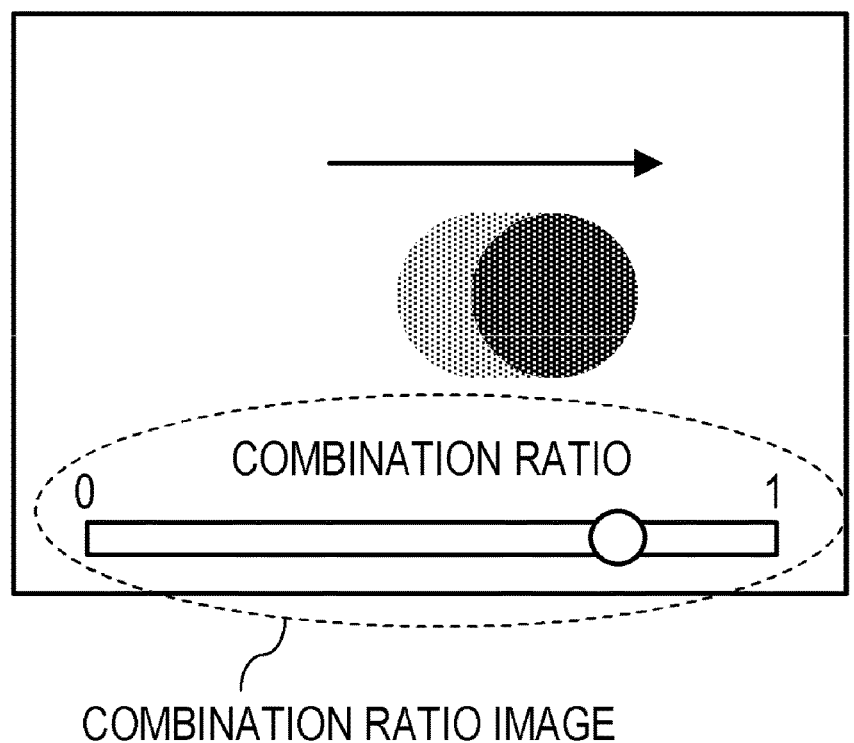
FIG. 14 is a diagram showing an example of a display image according to the third embodiment.

FIG. 14 is a diagram showing an example of a display image according to the present embodiment. In FIG. 14, a bar image indicating the combination ratio K is displayed as a combination ratio image. Moreover, a combination ratio image is not limited to the image shown in FIG. 14. For example, a text image describing a numerical value of the combination ratio K may be used as a combination ratio image. An icon corresponding to a value of the combination ratio K may be used as a combination ratio image.

As described above, according to the present embodiment, since a combination ratio is automatically determined based on imaging information, an effect similar to that of the first embodiment is achieved. In addition, in the present embodiment, the user is notified of a current combination ratio. Accordingly, the user can learn the combination ratio of an image being checked by the user. The combination ratio learned by the user is used in, for example, work performed separately. Specifically, the combination ratio learned by the user is used in retouching or the like using image data extracted as still image data. The combination ratio learned by the user may also be used to obtain a plurality of pieces of still image data by combining the first frame and the second frame at various combination ratios. Moreover, while an example where the user is notified of the combination ratio by image display has been described in the present embodiment, a method of notifying the user is not limited thereto. For example, the user may be notified of the combination ratio using sound or light from a lamp (a light source).

Fourth Embodiment

Hereinafter, an image display apparatus and an image-processing method according to a fourth embodiment of the present invention will be described. Hereinafter, configurations and processes that differ from those of the first embodiment will be described in detail and configurations and processes that are the same as those of the first embodiment will not be described. A configuration of an image display system according to the present embodiment is the same as in the first embodiment. In addition, configurations of the imaging apparatus, the reproducing apparatus, and the developing apparatus according to the present embodiment are also the same as in the first embodiment. Moreover, characteristic configurations of the present embodiment described below may be combined with configurations of the second and third embodiments.

Figure 15:
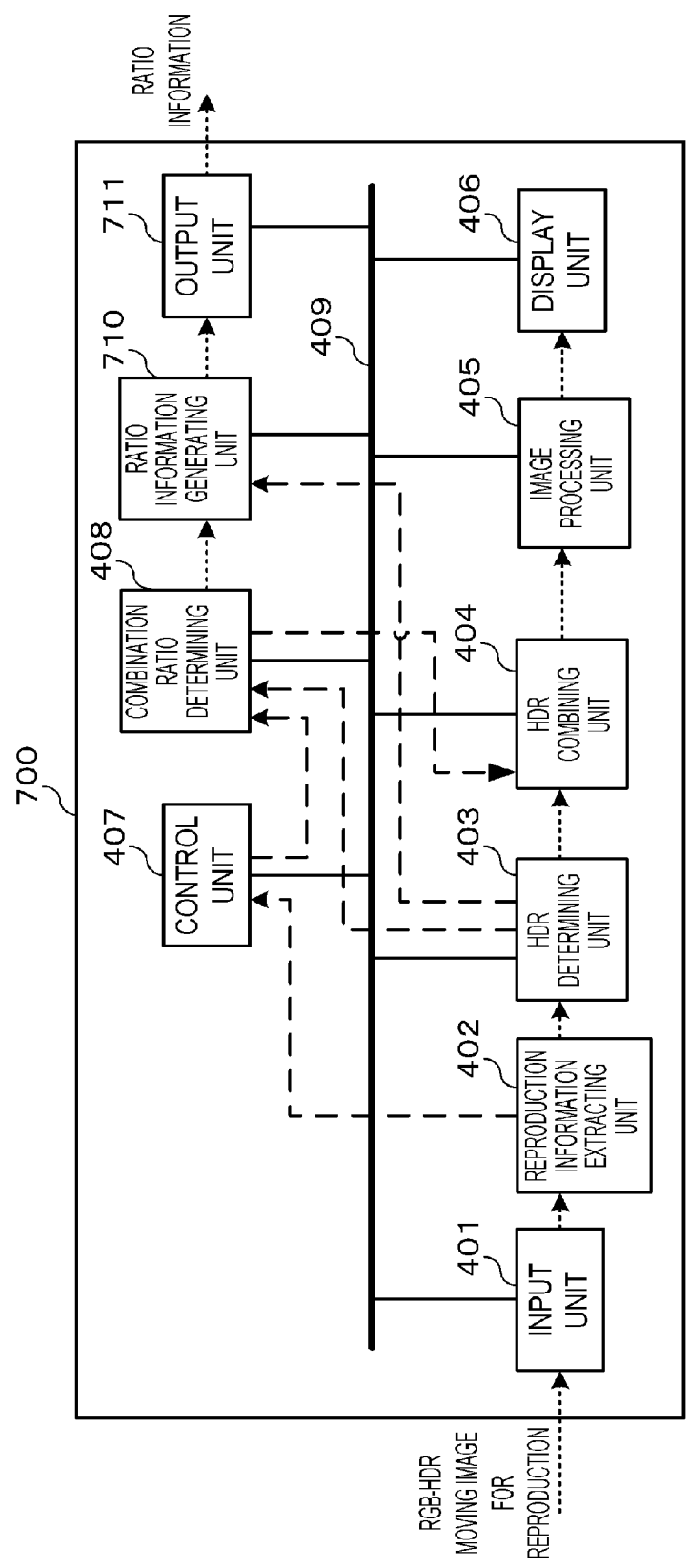
FIG. 15 is a block diagram showing an example of a functional configuration of an image display apparatus according to a fourth embodiment.
Figure 17A:
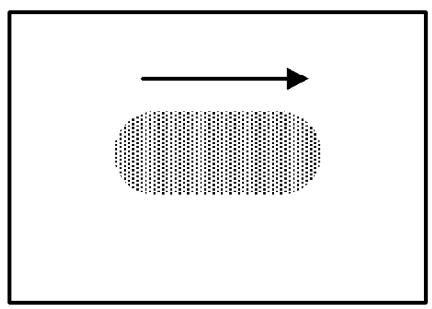
FIGS. 17A to 17D are diagrams showing examples of images.
Figure 17B:
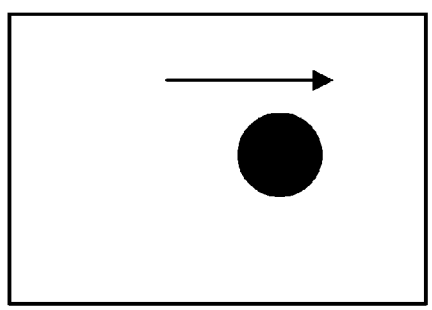
Figure 17C:
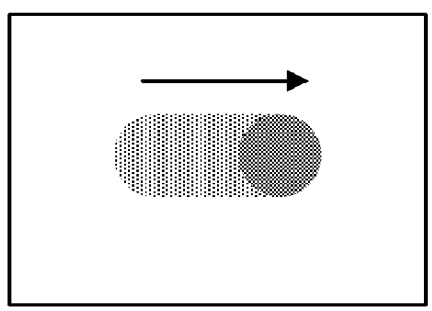
Figure 17D:
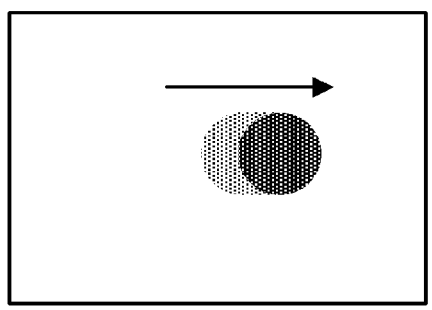
Figure 18:
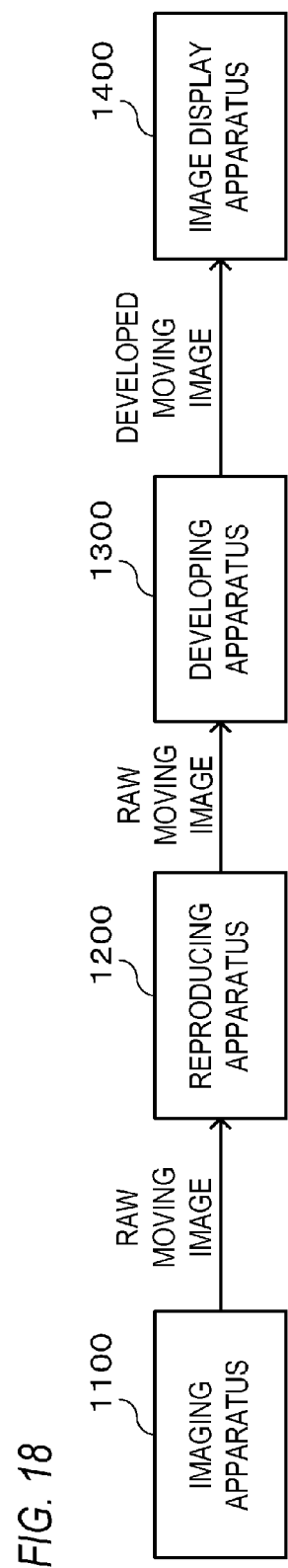
FIG. 18 is a diagram showing an example of an image display system.
Figure 19:
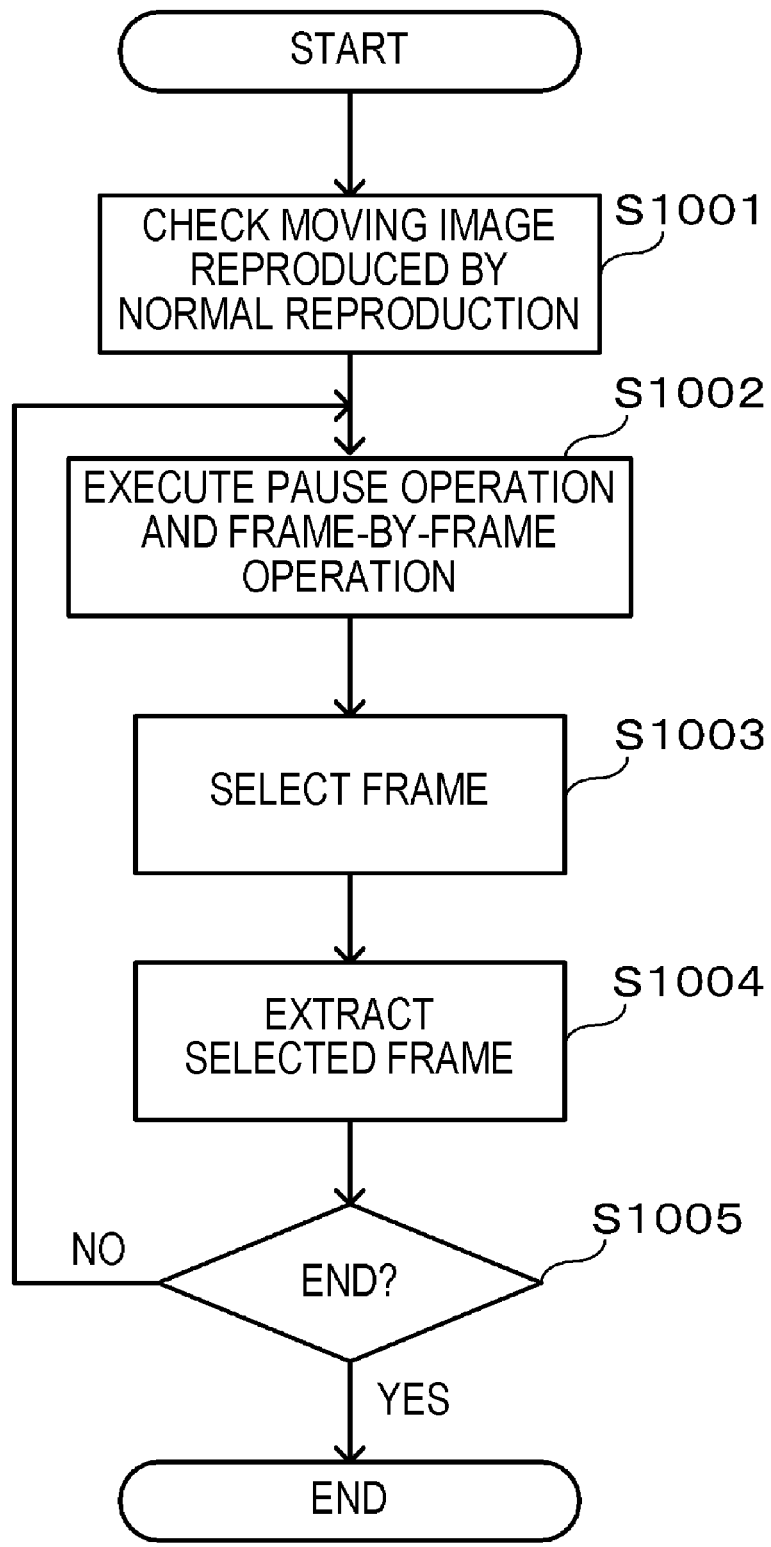
FIG. 19 is a flowchart showing an example of a motion capture work flow.

FIG. 15 is a block diagram showing an example of a functional configuration of an image display apparatus 700 according to the present embodiment. As shown in FIG. 15, the image display apparatus 700 at least includes the input unit 401, the reproduction information extracting unit 402, the HDR determining unit 403, the HDR combining unit 404, the image-processing unit 405, the display unit 406, the control unit 407, the combination ratio determining unit 408, a ratio information generating unit 710, and an output unit 711. These functional units are connected to each other by the internal bus 409. Transmission and reception of data among the functional units are performed using the internal bus 409. Operations of the respective functional units are controlled by the control unit 407. Moreover, in FIG. 15, same functional units as in the first embodiment (FIG. 7) are assigned same reference characters as in the first embodiment and descriptions thereof will be omitted.

In the present embodiment, the HDR determining unit 403 outputs extracted HDR meta information to the HDR combining unit 404, the combination ratio determining unit 408, and the ratio information generating unit 710. In addition, the combination ratio determining unit 408 outputs a determined combination ratio K to the HDR combining unit 404 and the ratio information generating unit 710.

The ratio information generating unit 710 generates ratio information by adding (associating) the combination ratio K output from the combination ratio determining unit 408 to the HDR meta information output from the HDR determining unit 403. In addition, the ratio information generating unit 710 includes a buffer for storing ratio information (HDR meta information to which the combination ratio K has been added) and records (overwrites) the ratio information on the buffer. Subsequently, the ratio information generating unit 710 reads out the ratio information from the buffer in accordance with an instruction from the control unit 407 and outputs the ratio information to the output unit 711. For example, the control unit 407 instructs the ratio information generating unit 710 to output the ratio information in accordance with a user operation. Moreover, HDR meta information need not be used. Any kind of information may be generated as ratio information as long as the information represents the combination ratio K. However, information in which the combination ratio K is associated with a frame pair is favorably used as ratio information.

The output unit 711 outputs the ratio information output from the ratio information generating unit 710 to the outside. For example, the output unit 711 records the ratio information on a storage apparatus that is an external apparatus connected to the image display apparatus 700 by outputting the ratio information in a file format to the outside. As the storage apparatus, for example, a magnetic disk, an optical disk, a semiconductor memory, or the like is used. As a semiconductor memory, for example, an SD card is used. The image display apparatus 700 may include a storage unit for ratio information and the ratio information output from the ratio information generating unit 710 may be recorded in the storage unit. One of an output process for outputting ratio information to the outside and a recording process for recording ratio information in a storage unit (the storage unit provided in the image display apparatus 700, a storage apparatus that is an external apparatus, or the like) may or may not be performed. Both an output process and a recording process may be performed. Moreover, ratio information related to each of a plurality of frame pairs may be output and recorded.

As described above, according to the present embodiment, since a combination ratio is automatically determined based on imaging information, an effect similar to that of the first embodiment is achieved. In addition, in the present embodiment, ratio information representing a combination ratio is output to the outside and recorded in a storage unit. The output or recorded combination ratio is used in, for example, work performed separately. Specifically, the output or recorded combination ratio is used in retouching or the like using image data extracted as still image data. The output or recorded combination ratio may also be used to obtain a plurality of pieces of still image data by combining the first frame and the second frame at various combination ratios.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-127843, filed on Jun. 25, 2015, and Japanese Patent Application No. 2016-078863, filed on Apr. 11, 2016, which are hereby incorporated by reference herein in their entirety.

What is claimed is:

1. An image-processing apparatus comprising:
a first acquiring unit configured to acquire moving image data including a first frame obtained by imaging and a second frame obtained by imaging with a shorter exposure time than the first frame;
a second acquiring unit configured to acquire reproduction information that is information related to a reproduction speed of the moving image data; and
a combining unit configured to combine the first frame and the second frame with each other based on the reproduction information, wherein
the combining unit changes a combination ratio between the first frame and the second frame in accordance with a reproduction speed of the moving image data.

2. The image-processing apparatus according to claim 1, wherein
in a case where reproduction information related to a first reproduction speed is acquired by the second acquiring unit, the combining unit determines a value larger than a case where reproduction information related to a second reproduction speed that is higher than the first reproduction speed is acquired by the second acquiring unit as a combination ratio of the second frame.

3. The image-processing apparatus according to claim 2, wherein
reproduction information related to the first reproduction speed is reproduction information representing a pause of the moving image data.

4. The image-processing apparatus according to claim 3, wherein
in a case where reproduction information related to the first reproduction speed is acquired by the second acquiring unit, the combining unit determines 0 as a combination ratio of the first frame and 1 as a combination ratio of the second frame.

5. The image-processing apparatus according to claim 2, wherein
in a case where reproduction information related to the first reproduction speed is acquired by the second acquiring unit, the combining unit determines the combination ratio based on exposure times of the first frame and the second frame.

6. The image-processing apparatus according to claim 5, wherein
the combining unit
determines a reference value as a combination ratio of the second frame in a case where reproduction information related to the second reproduction speed is acquired by the second acquiring unit, and
determines a value closer to the reference value than a case where a difference between exposure times of the first frame and the second frame is equal to or larger than a first threshold as a combination ratio of the second frame in a case where reproduction information related to the first reproduction speed is acquired by the second acquiring unit and the difference between exposure times of the first frame and the second frame is smaller than the first threshold.

7. The image-processing apparatus according to claim 5, further comprising
a third acquiring unit configured to acquire time information indicating an exposure time of each frame of the moving image data, wherein
in a case where reproduction information related to the first reproduction speed is acquired by the second acquiring unit, the combining unit determines the combination ratio using the time information.

8. The image-processing apparatus according to claim 1, further comprising
a fourth acquiring unit configured to acquire frame identification information for identifying the first frame and the second frame, wherein
the combining unit identifies the first frame and the second frame using the frame identification information.

9. The image-processing apparatus according to claim 1, further comprising
a fifth acquiring unit configured to acquire pair identification information for identifying a frame pair including the first frame and the second frame, wherein
the combining unit identifies the frame pair using the pair identification information.

10. The image-processing apparatus according to claim 1, further comprising
a determining unit configured to determine whether or not moving image data acquired by the first acquiring unit includes the first frame and the second frame.

11. The image-processing apparatus according to claim 10, further comprising
a sixth acquiring unit configured to acquire moving image identification information indicating whether or not moving image data acquired by the first acquiring unit includes the first frame and the second frame, wherein
the determining unit determines whether or not moving image data acquired by the first acquiring unit includes the first frame and the second frame in accordance with the moving image identification information.

12. The image-processing apparatus according to claim 1, wherein
the combining unit determines the combination ratio based on the moving image data so that black defects due to the combination of the first frame and the second frame do not occur.

13. The image-processing apparatus according to claim 12, further comprising
seventh acquiring unit which acquires each gradation value of a frame obtained by combining the first frame and the second frame in accordance with a candidate ratio that is a candidate of the combination ratio, wherein
the combining unit determines the combination ratio based on each gradation value acquired by the seventh acquiring unit so that a number of pixels with a gradation value after combining the first frame and the second frame being equal to or smaller than a second threshold becomes equal to or smaller than a third threshold.

14. The image-processing apparatus according to claim 1, further comprising
a notifying unit configured to notify a user of the combination ratio.

15. The image-processing apparatus according to claim 1, further comprising
a generating unit configured to generate, based on combine moving image data that is moving image data obtained by combining the first frame and the second frame and on the combination ratio, moving image data representing a moving image in which a graphic image representing the combination ratio is superimposed on a moving image based on the combine moving image data.

16. The image-processing apparatus according to claim 1, further comprising
an outputting unit configured to output ratio information representing the combination ratio to the outside.

17. The image-processing apparatus according to claim 1, further comprising
a recording unit configured to record ratio information representing the combination ratio in a storage unit.

18. An image-processing method comprising:
a first acquiring step acquiring moving image data including a first frame obtained by imaging and a second frame obtained by imaging with a shorter exposure time than the first frame;
a second acquiring step of acquiring reproduction information that is information related to a reproduction speed of the moving image data; and
a combining step of combining the first frame and the second frame with each other based on the reproduction information, wherein
in the combining step, a combination ratio between the first frame and the second frame is changed in accordance with a reproduction speed of the moving image data.

19. A non-transitory computer readable medium that stores a program, wherein
the program causes a computer to execute
a first acquiring step acquiring moving image data including a first frame obtained by imaging and a second frame obtained by imaging with a shorter exposure time than the first frame;
a second acquiring step of acquiring reproduction information that is information related to a reproduction speed of the moving image data; and
a combining step of combining the first frame and the second frame with each other based on the reproduction information, and
in the combining step, a combination ratio between the first frame and the second frame is changed in accordance with a reproduction speed of the moving image data.

* * * * *